US011272200B2

(12) United States Patent
Auyeung et al.

(10) Patent No.: US 11,272,200 B2
(45) Date of Patent: Mar. 8, 2022

(54) METHOD AND APPARATUS FOR VIDEO CODING

(71) Applicant: TENCENT AMERICA LLC, Palo Alto, CA (US)

(72) Inventors: Cheung Auyeung, Sunnyvale, CA (US); Xiang Li, Saratoga, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 16/908,504

(22) Filed: Jun. 22, 2020

(65) Prior Publication Data

US 2020/0404306 A1 Dec. 24, 2020

Related U.S. Application Data

(60) Provisional application No. 62/865,950, filed on Jun. 24, 2019.

(51) Int. Cl.
*H04N 19/176* (2014.01)
*H04N 19/105* (2014.01)
*H04N 19/44* (2014.01)
*H04N 19/70* (2014.01)
*H04N 19/159* (2014.01)
*H04N 19/13* (2014.01)

(52) U.S. Cl.
CPC ........... *H04N 19/44* (2014.11); *H04N 19/105* (2014.11); *H04N 19/13* (2014.11); *H04N 19/159* (2014.11); *H04N 19/176* (2014.11); *H04N 19/70* (2014.11)

(58) Field of Classification Search
CPC ...................................................... H04N 19/44
See application file for complete search history.

(56) References Cited

U.S. PATENT DOCUMENTS 9,237,353 B2 * 1/2016 Kim ........................ H04N 19/50
9,456,222 B2 * 9/2016 Kim ..................... H04N 19/103
(Continued)

OTHER PUBLICATIONS

Chen et al. "Algorithm Description of Joint Exploration Test Model 7 (JEM 7)," Joint Video Exploration Team (JVET) of ITU-T SG 16 WP 3 and ISO/IEC JTC 1/SC 29/WG 11, 7th Meeting: Torino, IT, Jul. 13-21, 2017 (50 pages).
(Continued)

*Primary Examiner* — Irfan Habib
(74) *Attorney, Agent, or Firm* — Oblon, McClelland, Maier & Neustadt, L.L.P.

(57) ABSTRACT

Aspects of the disclosure provide a method and an apparatus for video coding. In some examples, an apparatus includes processing circuitry that receives a bit stream that includes coded information representing a bin of a syntax element for a current block in a picture. The bin of the syntax element indicates whether a local illumination compensation (LIC) process is applied to code the current block. The processing circuitry selects a context model from multiple candidate context models applicable to coding of the syntax element, according to at least a coding characteristic of a region neighboring the current block, and decodes the coded information according to the selected context model to obtain the bin of the syntax element. The processing circuitry reconstructs the current block in response to the bin of the syntax element.

20 Claims, 22 Drawing Sheets

(56) References Cited

U.S. PATENT DOCUMENTS

| | | | | |
|---|---|---|---|---|
| 10,419,754 | B1* | 9/2019 | Zhao | H04N 19/11 |
| 10,834,409 | B2* | 11/2020 | Yu | H04N 19/577 |
| 2017/0150186 | A1* | 5/2017 | Zhang | H04N 19/625 |
| 2018/0063531 | A1* | 3/2018 | Hu | H04N 19/48 |
| 2018/0098086 | A1* | 4/2018 | Chuang | H04N 19/43 |
| 2019/0110058 | A1* | 4/2019 | Chien | H04N 19/513 |
| 2019/0124350 | A1* | 4/2019 | Thirumalai | H04N 19/56 |
| 2019/0215522 | A1* | 7/2019 | Zhang | H04N 19/105 |
| 2019/0230376 | A1* | 7/2019 | Hu | H04N 19/46 |
| 2019/0260996 | A1* | 8/2019 | Zhang | H04N 19/132 |
| 2019/0268594 | A1* | 8/2019 | Lim | H04N 19/46 |
| 2019/0313104 | A1* | 10/2019 | Yu | H04N 19/136 |

OTHER PUBLICATIONS

Seregin, V. et al. "CE10-related: Unidirectional illumination compensation," Local illumination compensation Test results, Qualcomm, JVET-M0500 (4 pages).

Appendix A, JVET-M0500 sheet (84 pages).

Bross, et al. "Versatile Video Coding (Draft 3)," Joint Video Experts Team (JVET) of ITU-T SG 16 WP 3 and ISO/IEC JTC 1/SC 29/WG 11 12th Meeting: Macao, CN, Oct. 3-12, 2018, JVET-M0500 LIC JVET L1001 v7 (230 pages).

Appendix B, JVET-M0500 Test 2 Desable 4x4 128xN (84 pages).

Appendix C, JVET-M0500 Test 3 (84 pages).

Seregin, V. et al. "CE10-related: Unidirectional illumination compensation," Joint Video Experts Team (JVET) of ITU-T SG 16 WP 3 and ISO/IEC JTC 1/SC 29/WG 11 13th Meeting: Marrakech, MA, Jan. 9-18, 2019, JVET-M0500 v3 (4 pages).

Bross, et al. "Versatile Video Coding (Draft 5)" Joint Video Experts Team (JVET) of ITU-T SG 16 WP 3 and ISO/IEC JTC 1/SC 29/WG 11 14th Meeting: Geneva, CH, Mar. 19-27, 2019 JVET-N1001 v7 (386 pages).

Yang, H. et al. "Description of Core Experiment 4 (CE4): Inter prediction" Joint Video Experts Team (JVET) of ITU-T SG 16 WP 3 and ISO/IEC JTC 1/SC 29/WG 11 14th Meeting: Geneva, CH, Mar. 19-27, 2019 JVET-N1024 v3 (12 pages).

Seregin, V. et al. "CE4-3.1a and CE4-3.1b: Unidirectional local illumination compensation with affine prediction" Joint Video Experts Team (JVET) of ITU-T SG 16 WP 3 and ISO/IEC JTC 1/SC 29/WG 11 15th Meeting: Gothenburg, SE, Jul. 3-12, 2019 JVET-O0066 v1 (5 pages).

Appendix D, JVET-O0066 CE4-3.1a (83 pages).

Appendix E, JVET-O0066 CE4-3.1b (83 pages).

Bross, B et al. "Versatile Video Coding (Draft 5)" Joint Video Experts Team (JVET) of ITU-T SG 16 WP 3 and ISO/IEC JTC 1/SC 29/WG 11 14th Meeting: Geneva, CH, Mar. 19-27, 2019 JVET-N1001-v8 (405 pages).

Filippov, A. "CE4-3.2a and CE4-3.2b: Unidirectional local illumination compensation with affine prediction and simplified linear model parameter derivation based on min / max method" Joint Video Experts Team (JVET) of ITU-T SG 16 WP 3 and ISO/IEC JTC 1/SC 29/WG 11 15th Meeting: Gothenburg, SE, Jul. 3-12, 2019 JVET-O0086-v1 (8 pages).

Bross, B. et al. "Versatile Video Coding (Draft 5)" Joint Video Experts Team (JVET) of ITU-T SG 16 WP 3 and ISO/IEC JTC 1/SC 29/WG 11 14th Meeting: Geneva, CH, Mar. 19-27, 2019 Document JVET-N1001-V9, JVET-O0086 CE4-3.2 (412 pages).

Appendix F, vtm5 ce4-3.2a tester (72 pages).

Appendix G, vtm5 ce4-3.2a ref Copy tester (72 pages).

Appendix H, vtm5 ce4-3.2a ref Copy No. TFilter tester (72 pages).

Appendix I, vtm5 ce4-3.2a ref Copy No. TFilter conv Beta tester (72 pages).

Appendix J, vtm5 ce4-3.2b tester (62 pages).

Appendix K, vtm5 ce4-3.2b ref Copy tester (68 pages).

Appendix L, vtm5 ce4-3.2b ref Copy No. TFilter tester (62 pages).

Appendix M, vtm5 ce4-3.2b ref Copy No. TFilter conv Beta tester (62 pages).

* cited by examiner

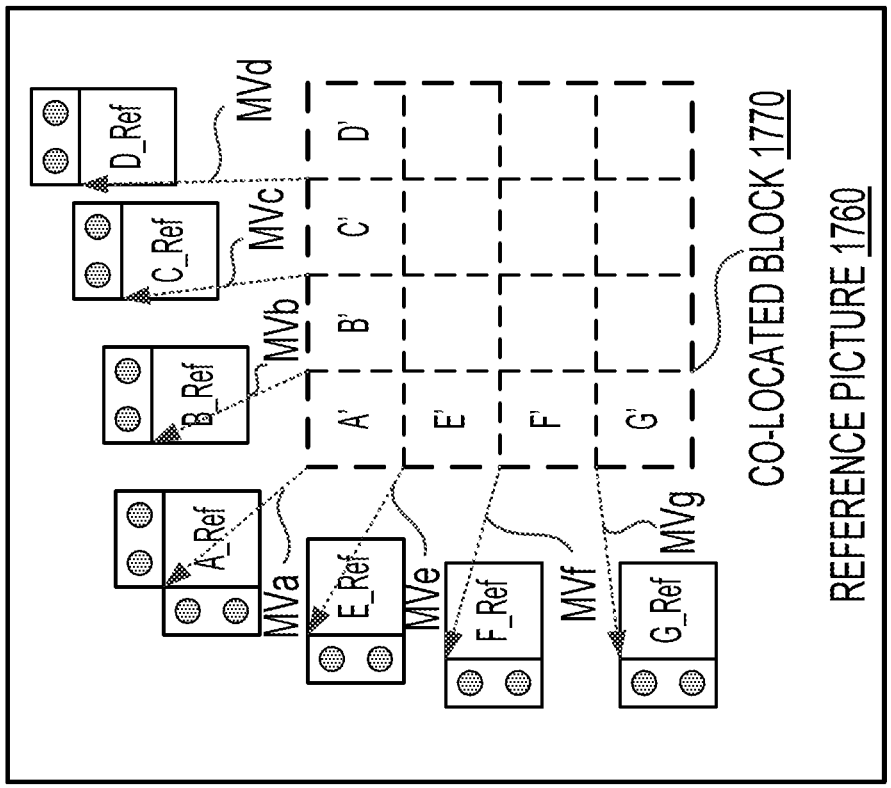
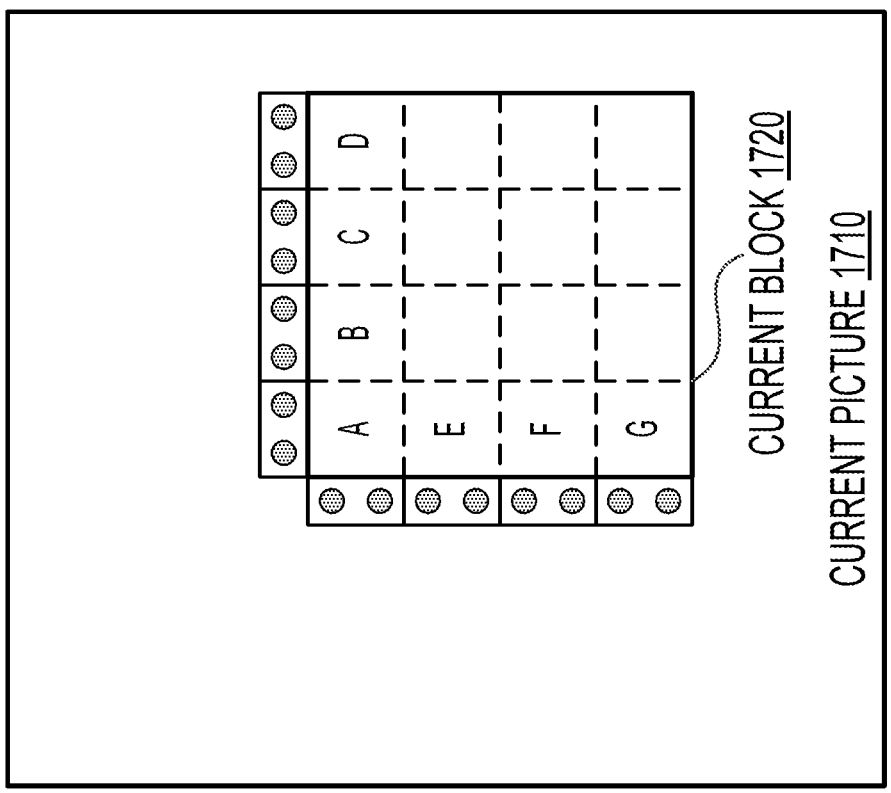
FIG. 17

METHOD AND APPARATUS FOR VIDEO CODING

INCORPORATION BY REFERENCE

This present application claims the benefit of priority to U.S. Provisional Application No. 62/865,950, entitled "LIC Signaling Methods" and filed on Jun. 24, 2019, which is incorporated by reference herein in its entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Uncompressed digital video can include a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed video has specific bitrate requirements. For example, 1080p60 4:2:0 video at 8 bit per sample (1920× 1080 luminance sample resolution at 60 Hz frame rate) requires close to 1.5 Gbit/s bandwidth. An hour of such video requires more than 600 GBytes of storage space.

One purpose of video coding and decoding can be the reduction of redundancy in the input video signal, through compression. Compression can help reduce the aforementioned bandwidth and/or storage space requirements, in some cases by two orders of magnitude or more. Both lossless compression and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

A video encoder and decoder can utilize techniques from several broad categories, including, for example, intra coding, inter prediction with motion compensation, transform, quantization, and entropy coding.

In intra coding, sample values are represented without reference to samples or other data from previously reconstructed reference pictures. In some video codecs, the picture is spatially subdivided into blocks of samples. When all blocks of samples are coded in intra mode, that picture can be an intra picture. Intra pictures and their derivations such as independent decoder refresh pictures, can be used to reset the decoder state and can, therefore, be used as the first picture in a coded video bitstream and a video session, or as a still image. The samples of an intra block can be exposed to a transform, and the transform coefficients can be quantized before entropy coding. Intra prediction can be a technique that minimizes sample values in the pre-transform domain. In some cases, the smaller the DC value after a transform is, and the smaller the AC coefficients are, the fewer the bits that are required at a given quantization step size to represent the block after entropy coding.

Traditional intra coding such as known from, for example MPEG-2 generation coding technologies, does not use intra prediction. However, some newer video compression technologies include techniques that attempt, from, for example, surrounding sample data and/or metadata obtained during the encoding/decoding of spatially neighboring, and preceding in decoding order, blocks of data. Such techniques are henceforth called "intra prediction" techniques. Note that in at least some cases, intra prediction is using reference data only from the current picture under reconstruction and not from reference pictures.

There can be many different forms of intra prediction. When more than one of such techniques can be used in a given video coding technology, the technique in use can be coded in an intra prediction mode. In certain cases, modes can have submodes and/or parameters, and those can be coded individually or included in the mode codeword. Which codeword to use for a given mode/submode/parameter combination can have an impact in the coding efficiency gain through intra prediction, and so can the entropy coding technology used to translate the codewords into a bitstream.

A certain mode of intra prediction was introduced with H.264, refined in H.265, and further refined in newer coding technologies such as joint exploration model (JEM), versatile video coding (VVC), and benchmark set (BMS). A predictor block can be formed using neighboring sample values belonging to already available samples. Sample values of neighboring samples are copied into the predictor block according to a direction. A reference to the direction in use can be coded in the bitstream or may itself be predicted.

The number of possible directions has increased as video coding technology has developed. In H.264 (year 2003), nine different direction could be represented. That increased to 33 in H.265 (year 2013), and JEM/VVC/BMS, at the time of disclosure, can support up to 65 directions. Experiments have been conducted to identify the most likely directions, and certain techniques in the entropy coding are used to represent those likely directions in a small number of bits, accepting a certain penalty for less likely directions. Further, the directions themselves can sometimes be predicted from neighboring directions used in neighboring, already decoded, blocks.

The mapping of intra prediction directions bits in the coded video bitstream that represent the direction can be different from video coding technology to video coding technology; and can range, for example, from simple direct mappings of prediction direction to intra prediction mode, to codewords, to complex adaptive schemes involving most probable modes, and similar techniques. In all cases, however, there can be certain directions that are statistically less likely to occur in video content than certain other directions. As the goal of video compression is the reduction of redundancy, those less likely directions will, in a well working video coding technology, be represented by a larger number of bits than more likely directions.

Moreover, in inter prediction, motion compensation can be a lossy compression technique and can relate to techniques where a block of sample data from a previously reconstructed picture or part thereof (reference picture), after being spatially shifted in a direction indicated by a motion vector (MV henceforth), is used for the prediction of a newly reconstructed picture or picture part. In some cases, the reference picture can be the same as the picture currently under reconstruction. MVs can have two dimensions X and Y, or three dimensions, the third being an indication of the reference picture in use (the latter, indirectly, can be a time dimension).

In some video compression techniques, an MV applicable to a certain area of sample data can be predicted from other MVs, for example from those related to another area of sample data spatially adjacent to the area under reconstruction, and preceding that MV in decoding order. Doing so can substantially reduce the amount of data required for coding the MV, thereby removing redundancy and increasing compression. MV prediction can work effectively, for example, because when coding an input video signal derived from a camera (known as natural video) there is a statistical likelihood that areas larger than the area to which a single MV is applicable move in a similar direction and, therefore, can in some cases be predicted using a similar motion vector derived from MVs of neighboring area. That results in the MV found for a given area to be similar or the same as the MV predicted from the surrounding MVs, and that in turn can be represented, after entropy coding, in a smaller number of bits than what would be used if coding the MV directly. In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding," December 2016). Out of the many MV prediction mechanisms that H.265 offers, described here is a technique henceforth referred to as "spatial merge".

Referring to FIG. 1, a current block (101) comprises samples that have been found by the encoder during the motion search process to be predictable from a previous block of the same size that has been spatially shifted. Instead of coding that MV directly, the MV can be derived from metadata associated with one or more reference pictures, for example from the most recent (in decoding order) reference picture, using the MV associated with either one of five surrounding samples, denoted A0, A1, and B0, B1, B2 (102 through 106, respectively). In H.265, the MV prediction can use predictors from the same reference picture that the neighboring block is using.

SUMMARY

Aspects of the disclosure provide methods and apparatuses for video encoding/decoding. In some examples, an apparatus for video decoding includes receiving circuitry and processing circuitry.

Aspects of the disclosure provide methods and apparatuses for video encoding/decoding. In some examples, an apparatus includes processing circuitry that receives a bit stream that includes coded information representing a bin of a syntax element for a current block in a picture The bin of the syntax element indicates whether a local illumination compensation (LIC) process is applied to code the current block. The processing circuitry selects a context model from multiple candidate context models applicable to coding of the syntax element, according to at least a coding characteristic of a region neighboring the current block, and decodes the coded information according to the selected context model to obtain the bin of the syntax element. The processing circuitry reconstructs the current block with the LIC process, in response to the bin indicating that the LIC process is applied to code the current block; and reconstructs the current block without the LIC process, in response to the bin indicating that the LIC process is not applied to code the current block.

In one embodiment, the processing circuitry determines whether at least one of top row sub-blocks or left column sub-blocks of the current block meet one or more conditions for applying the LIC process. The processing circuitry can select a first one of the multiple candidate context models as the selected context model in response to the at least one of the top row sub-blocks and the left column sub-blocks being determined to meet the one or more conditions. The processing circuitry can select a second one of the multiple candidate context models as the selected context model in response to none of the top row sub-blocks and the left column sub-blocks being determined to meet the one or more conditions.

In some examples, the first one of the multiple candidate context models corresponds to a first probability of the bin indicating that a probability of applying the LIC process is higher than a probability of not applying the LIC process, and the second one of the multiple candidate context models corresponds to a second probability of the bin indicating that the probability of not applying the LIC process is higher than the probability of applying the LIC process.

In some examples, each one of the multiple candidate context models is associated with a corresponding context incremental index. The first one of the multiple candidate context models is associated with a first context incremental index having a value of one of 0 and 1. The second one of the multiple candidate context models is associated with a second context incremental index having a value of the other one of 0 and 1.

In some embodiments, the one or more conditions includes, for a first sub-block that is one of the top row sub-blocks, an above block neighboring an upper side of the first sub-block being coded according to an inter prediction with no residue. Also, for a second sub-block that is one of the left column sub-blocks, a left block neighboring a left side of the second sub-block being coded according to the inter prediction with no residue.

In some embodiments, the one or more conditions includes, for a first sub-block that is one of the top row sub-blocks, an above block neighboring an upper side of the first sub-block being coded with root coded block flag (CBF) not zero, the above block being coded according to an inter prediction, and the above block not being coded according to a combined intra and inter prediction (CIIP). Also, for a second sub-block that is one of the left column sub-blocks, a left block neighboring a left side of the second sub-block being coded with the root CBF not zero, the left block being coded according to the inter prediction, and the left block not being coded according to the CIIP.

In some examples, the top row sub-blocks and the left column sub-blocks of the current block are within an upper left 16×16 sample region of the current block in a case that the current block has a size greater than 16×16 samples.

Aspects of the disclosure also provide a non-transitory computer-readable medium storing instructions which when executed by a computer for video decoding cause the computer to perform any one or a combination of the methods for video decoding.

BRIEF DESCRIPTION OF THE DRAWINGS

Further features, the nature, and various advantages of the disclosed subject matter will be more apparent from the following detailed description and the accompanying drawings in which:

FIG. 17 shows an example of a second method for fetching reference samples in accordance with one embodiment.

DETAILED DESCRIPTION OF EMBODIMENTS

I. Video Coding Encoder and Decoder

Figure 1:
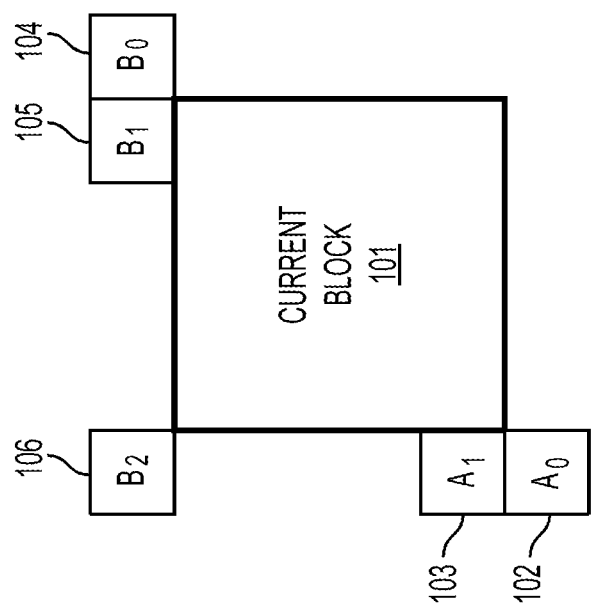
FIG. 1 is a schematic illustration of a current block and its surrounding spatial merge candidates in one example.
Figure 2:
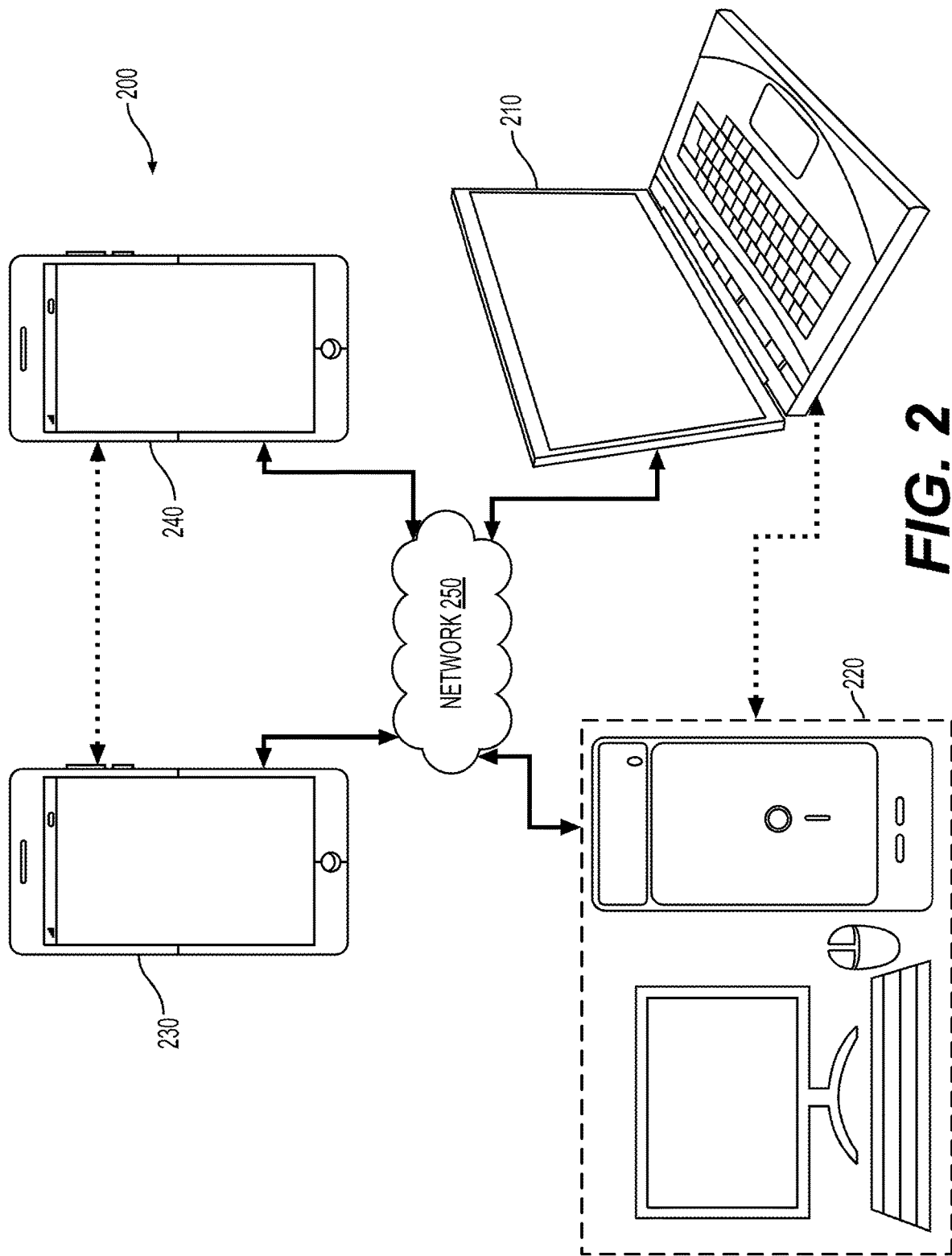
FIG. 2 is a schematic illustration of a simplified block diagram of a communication system (200) in accordance with an embodiment.

FIG. 2 illustrates a simplified block diagram of a communication system (200) according to an embodiment of the present disclosure. The communication system (200) includes a plurality of terminal devices that can communicate with each other, via, for example, a network (250). For example, the communication system (200) includes a first pair of terminal devices (210) and (220) interconnected via the network (250). In the FIG. 2 example, the first pair of terminal devices (210) and (220) performs uni-directional transmission of data. For example, the terminal device (210) may code video data (e.g., a stream of video pictures that are captured by the terminal device (210)) for transmission to the other terminal device (220) via the network (250). The encoded video data can be transmitted in the form of one or more coded video bitstreams. The terminal device (220) may receive the coded video data from the network (250), decode the coded video data to recover the video pictures and display video pictures according to the recovered video data. Uni-directional data transmission may be common in media serving applications and the like.

In another example, the communication system (200) includes a second pair of terminal devices (230) and (240) that performs bi-directional transmission of coded video data that may occur, for example, during videoconferencing. For bi-directional transmission of data, in an example, each terminal device of the terminal devices (230) and (240) may code video data (e.g., a stream of video pictures that are captured by the terminal device) for transmission to the other terminal device of the terminal devices (230) and (240) via the network (250). Each terminal device of the terminal devices (230) and (240) also may receive the coded video data transmitted by the other terminal device of the terminal devices (230) and (240), and may decode the coded video data to recover the video pictures and may display video pictures at an accessible display device according to the recovered video data.

In the FIG. 2 example, the terminal devices (210), (220), (230), and (240) may be illustrated as servers, personal computers, and smart phones, but the principles of the present disclosure may be not so limited. Embodiments of the present disclosure find application with laptop computers, tablet computers, media players, and/or dedicated video conferencing equipment. The network (250) represents any number of networks that convey coded video data among the terminal devices (210), (220), (230), and (240), including for example wireline (wired) and/or wireless communication networks. The communication network (250) may exchange data in circuit-switched and/or packet-switched channels. Representative networks include telecommunications networks, local area networks, wide area networks and/or the Internet. For the purposes of the present discussion, the architecture and topology of the network (250) may be immaterial to the operation of the present disclosure unless explained herein below.

Figure 3:
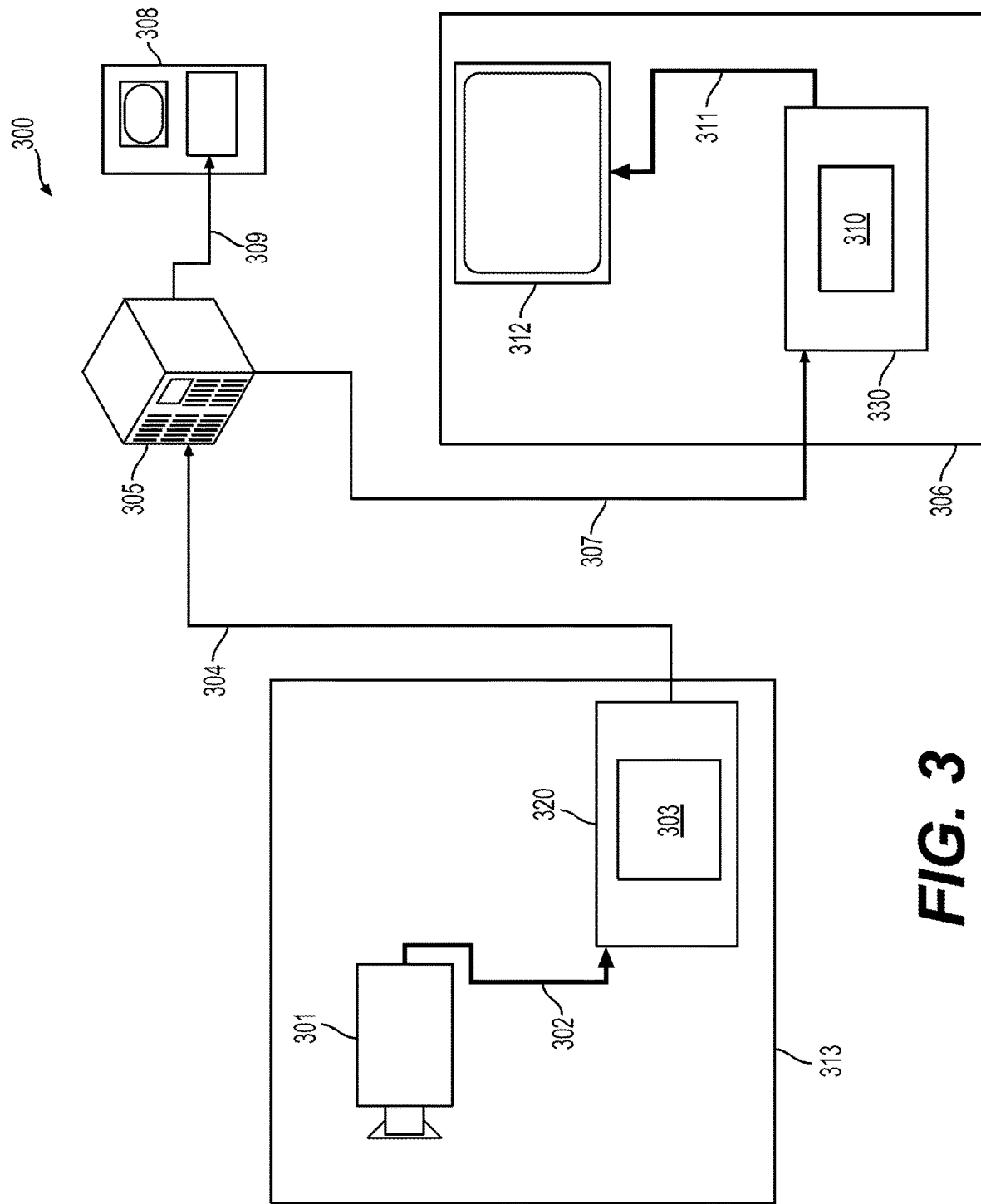
FIG. 3 is a schematic illustration of a simplified block diagram of a communication system (300) in accordance with an embodiment.

FIG. 3 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (313) that can include a video source (301), for example a digital camera, creating for example a stream of video pictures (302) that are uncompressed. In an example, the stream of video pictures (302) includes samples that are taken by the digital camera. The stream of video pictures (302), depicted as a bold line to emphasize a high data volume when compared to encoded video data (304) (or coded video bitstreams), can be processed by an electronic device (320) that includes a video encoder (303) coupled to the video source (301). The video encoder (303) can include hardware, software, or a combination thereof to enable or implement aspects of the disclosed subject matter as described in more detail below. The encoded video data (304) (or encoded video bitstream (304)), depicted as a thin line to emphasize the lower data volume when compared to the stream of video pictures (302), can be stored on a streaming server (305) for future use. One or more streaming client subsystems, such as client subsystems (306) and (308) in FIG. 3 can access the streaming server (305) to retrieve copies (307) and (309) of the encoded video data (304). A client subsystem (306) can include a video decoder (310), for example, in an electronic device (330). The video decoder (310) decodes the incoming copy (307) of the encoded video data and creates an outgoing stream of video pictures (311) that can be rendered on a display (312) (e.g., display screen) or other rendering device (not depicted). In some streaming systems, the encoded video data (304), (307), and (309) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (320) and (330) can include other components (not shown). For example, the electronic device (320) can include a video decoder (not shown) and the electronic device (330) can include a video encoder (not shown) as well.

Figure 4:
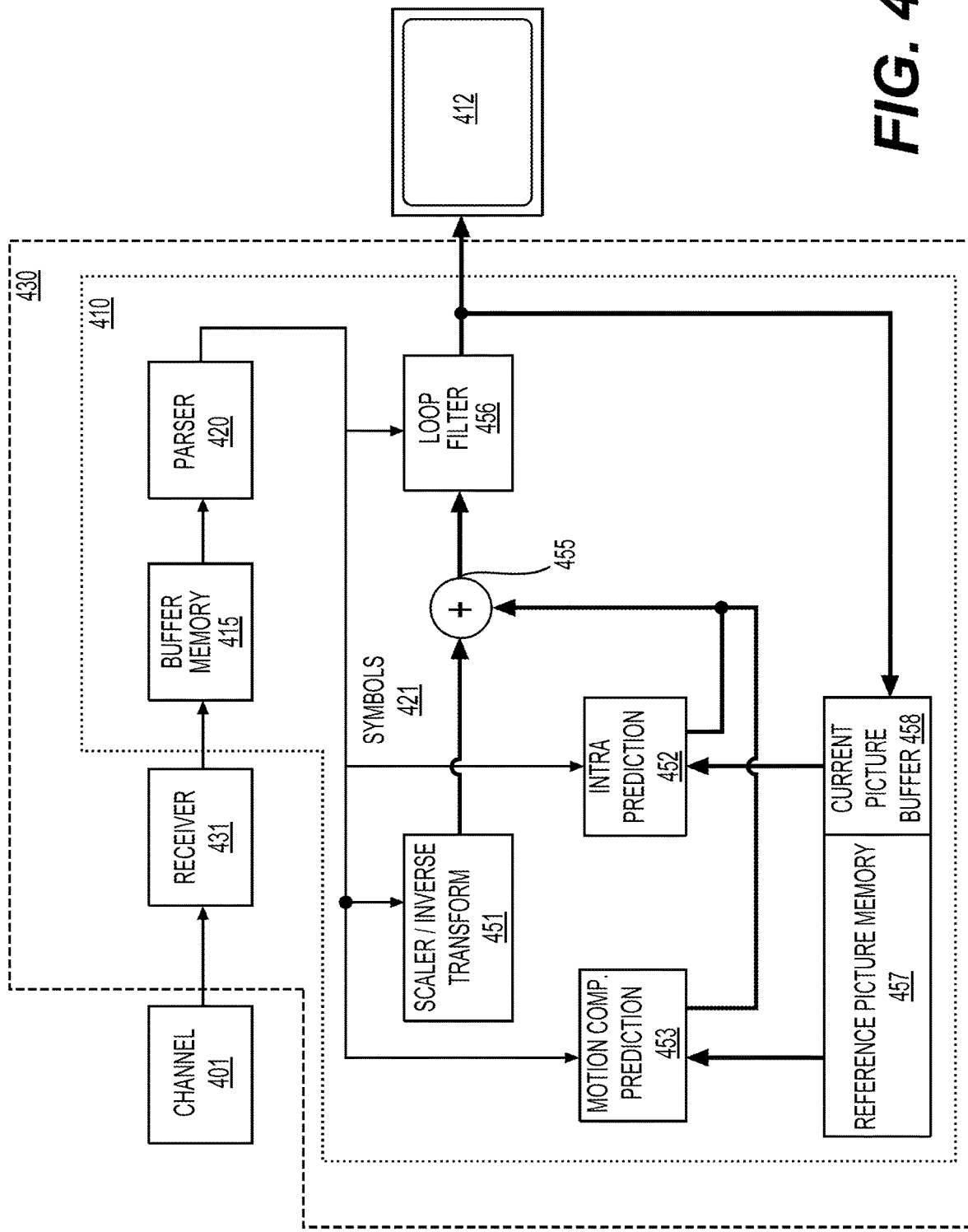
FIG. 4 is a schematic illustration of a simplified block diagram of a decoder in accordance with an embodiment.

FIG. 4 shows a block diagram of a video decoder (410) according to an embodiment of the present disclosure. The video decoder (410) can be included in an electronic device (430). The electronic device (430) can include a receiver (431) (e.g., receiving circuitry). The video decoder (410) can be used in the place of the video decoder (310) in the FIG. 3 example.

The receiver (431) may receive one or more coded video sequences to be decoded by the video decoder (410); in the same or another embodiment, one coded video sequence at a time, where the decoding of each coded video sequence is independent from other coded video sequences. The coded video sequence may be received from a channel (401), which may be a hardware/software link to a storage device which stores the encoded video data. The receiver (431) may receive the encoded video data with other data, for example, coded audio data and/or ancillary data streams, that may be forwarded to their respective using entities (not depicted). The receiver (431) may separate the coded video sequence from the other data. To combat network jitter, a buffer memory (415) may be coupled in between the receiver (431) and an entropy decoder/parser (420) ("parser (420)" henceforth). In certain applications, the buffer memory (415) is part of the video decoder (410). In others, it can be outside of the video decoder (410) (not depicted). In still others, there can be a buffer memory (not depicted) outside of the video decoder (410), for example to combat network jitter, and in addition another buffer memory (415) inside the video decoder (410), for example to handle playout timing. When the receiver (431) is receiving data from a store/forward device of sufficient bandwidth and controllability, or from an isosynchronous network, the buffer memory (415) may not be needed, or can be small. For use on best effort packet networks such as the Internet, the buffer memory (415) may be required, can be comparatively large and can be advantageously of adaptive size, and may at least partially be implemented in an operating system or similar elements (not depicted) outside of the video decoder (410).

The video decoder (410) may include the parser (420) to reconstruct symbols (421) from the coded video sequence. Categories of those symbols include information used to manage operation of the video decoder (410), and potentially information to control a rendering device such as a render device (412) (e.g., a display screen) that is not an integral part of the electronic device (430) but can be coupled to the electronic device (430), as was shown in FIG. 4. The control information for the rendering device(s) may be in the form of Supplemental Enhancement Information (SEI messages) or Video Usability Information (VUI) parameter set fragments (not depicted). The parser (420) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (420) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs), and so forth. The parser (420) may also extract from the coded video sequence information such as transform coefficients, quantizer parameter values, motion vectors, and so forth.

The parser (420) may perform an entropy decoding/parsing operation on the video sequence received from the buffer memory (415), so as to create symbols (421).

Reconstruction of the symbols (421) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (420). The flow of such subgroup control information between the parser (420) and the multiple units below is not depicted for clarity.

Beyond the functional blocks already mentioned, the video decoder (410) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (451). The scaler/inverse transform unit (451) receives a quantized transform coefficient as well as control information, including which transform to use, block size, quantization factor, quantization scaling matrices, etc. as symbol(s) (421) from the parser (420). The scaler/inverse transform unit (451) can output blocks comprising sample values that can be input into aggregator (455).

In some cases, the output samples of the scaler/inverse transform (451) can pertain to an intra coded block; that is: a block that is not using predictive information from previously reconstructed pictures, but can use predictive information from previously reconstructed parts of the current picture. Such predictive information can be provided by an intra picture prediction unit (452). In some cases, the intra picture prediction unit (452) generates a block of the same size and shape of the block under reconstruction, using surrounding already reconstructed information fetched from the current picture buffer (458). The current picture buffer (458) buffers, for example, partly reconstructed current picture and/or fully reconstructed current picture. The aggregator (455), in some cases, adds, on a per sample basis, the prediction information the intra prediction unit (452) has generated to the output sample information as provided by the scaler/inverse transform unit (451).

In other cases, the output samples of the scaler/inverse transform unit (451) can pertain to an inter coded, and potentially motion compensated block. In such a case, a motion compensation prediction unit (453) can access reference picture memory (457) to fetch samples used for prediction. After motion compensating the fetched samples in accordance with the symbols (421) pertaining to the block, these samples can be added by the aggregator (455) to the output of the scaler/inverse transform unit (451) (in this case called the residual samples or residual signal) so as to generate output sample information. The addresses within the reference picture memory (457) from where the motion compensation prediction unit (453) fetches prediction samples can be controlled by motion vectors, available to the motion compensation prediction unit (453) in the form of symbols (421) that can have, for example X, Y, and reference picture components. Motion compensation also can include interpolation of sample values as fetched from the reference picture memory (457) when sub-sample exact motion vectors are in use, motion vector prediction mechanisms, and so forth.

The output samples of the aggregator (455) can be subject to various loop filtering techniques in the loop filter unit (456). Video compression technologies can include in-loop filter technologies that are controlled by parameters included in the coded video sequence (also referred to as coded video bitstream) and made available to the loop filter unit (456) as symbols (421) from the parser (420), but can also be responsive to meta-information obtained during the decoding of previous (in decoding order) parts of the coded picture or coded video sequence, as well as responsive to previously reconstructed and loop-filtered sample values.

The output of the loop filter unit (456) can be a sample stream that can be output to the render device (412) as well as stored in the reference picture memory (457) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (420)), the current picture buffer (458) can become a part of the reference picture memory (457), and a fresh current picture buffer can be reallocated before commencing the reconstruction of the following coded picture.

The video decoder (410) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (431) may receive additional (redundant) data with the encoded video. The additional data may be included as part of the coded video sequence(s). The additional data may be used by the video decoder (410) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 5:
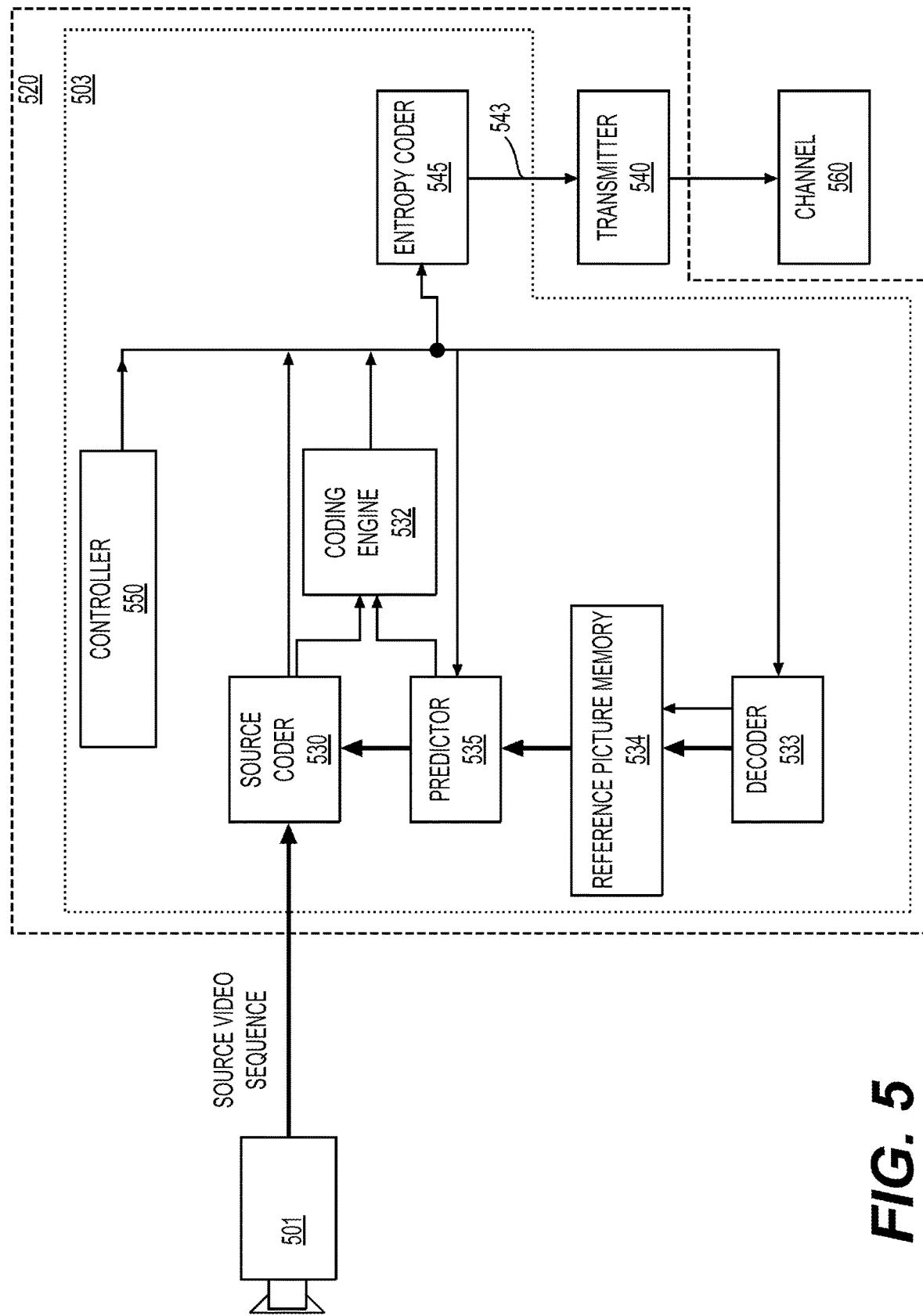
FIG. 5 is a schematic illustration of a simplified block diagram of an encoder in accordance with an embodiment.

FIG. 5 shows a block diagram of a video encoder (503) according to an embodiment of the present disclosure. The video encoder (503) is included in an electronic device (520). The electronic device (520) includes a transmitter (540) (e.g., transmitting circuitry). The video encoder (503) can be used in the place of the video encoder (303) in the FIG. 3 example.

The video encoder (503) may receive video samples from a video source (501) (that is not part of the electronic device (520) in the FIG. 5 example) that may capture video image(s) to be coded by the video encoder (503). In another example, the video source (501) is a part of the electronic device (520).

The video source (501) may provide the source video sequence to be coded by the video encoder (503) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (501) may be a storage device storing previously prepared video. In a videoconferencing system, the video source (501) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (503) may code and compress the pictures of the source video sequence into a coded video sequence (543) in real time or under any other time constraints as required by the application. Enforcing appropriate coding speed is one function of a controller (550). In some embodiments, the controller (550) controls other functional units as described below and is functionally coupled to the other functional units. The coupling is not depicted for clarity. Parameters set by the controller (550) can include rate control related parameters (picture skip, quantizer, lambda value of rate-distortion optimization techniques, . . . ), picture size, group of pictures (GOP) layout, maximum motion vector search range, and so forth. The controller (550) can be configured to have other suitable functions that pertain to the video encoder (503) optimized for a certain system design.

In some embodiments, the video encoder (503) is configured to operate in a coding loop. As an oversimplified description, in an example, the coding loop can include a source coder (530) (e.g., responsible for creating symbols, such as a symbol stream, based on an input picture to be coded, and a reference picture(s)), and a (local) decoder (533) embedded in the video encoder (503). The decoder (533) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (534). As the decoding of a symbol stream leads to bit-exact results independent of decoder location (local or remote), the content in the reference picture memory (534) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (533) can be the same as of a "remote" decoder, such as the video decoder (410), which has already been described in detail above in conjunction with FIG. 4. Briefly referring also to FIG. 4, however, as symbols are available and encoding/decoding of symbols to a coded video sequence by an entropy coder (545) and the parser (420) can be lossless, the entropy decoding parts of the video decoder (410), including the buffer memory (415), and parser (420) may not be fully implemented in the local decoder (533).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (530) may perform motion compensated predictive coding, which codes an input picture predictively with reference to one or more previously coded picture from the video sequence that were designated as "reference pictures." In this manner, the coding engine (532) codes differences between pixel blocks of an input picture and pixel blocks of reference picture(s) that may be selected as prediction reference(s) to the input picture.

The local video decoder (533) may decode coded video data of pictures that may be designated as reference pictures, based on symbols created by the source coder (530). Operations of the coding engine (532) may advantageously be lossy processes. When the coded video data may be decoded at a video decoder (not shown in FIG. 5), the reconstructed video sequence typically may be a replica of the source video sequence with some errors. The local video decoder (533) replicates decoding processes that may be performed by the video decoder on reference pictures and may cause reconstructed reference pictures to be stored in the reference picture cache (534). In this manner, the video encoder (503) may store copies of reconstructed reference pictures locally that have common content as the reconstructed reference pictures that will be obtained by a far-end video decoder (absent transmission errors).

The predictor (535) may perform prediction searches for the coding engine (532). That is, for a new picture to be coded, the predictor (535) may search the reference picture memory (534) for sample data (as candidate reference pixel blocks) or certain metadata such as reference picture motion vectors, block shapes, and so on, that may serve as an appropriate prediction reference for the new pictures. The predictor (535) may operate on a sample block-by-pixel block basis to find appropriate prediction references. In some cases, as determined by search results obtained by the predictor (535), an input picture may have prediction references drawn from multiple reference pictures stored in the reference picture memory (534).

The controller (550) may manage coding operations of the source coder (530), including, for example, setting of parameters and subgroup parameters used for encoding the video data.

Output of all aforementioned functional units may be subjected to entropy coding in the entropy coder (545). The entropy coder (545) translates the symbols as generated by the various functional units into a coded video sequence, by lossless compressing the symbols according to technologies such as Huffman coding, variable length coding, arithmetic coding, and so forth.

The transmitter (540) may buffer the coded video sequence(s) as created by the entropy coder (545) to prepare for transmission via a communication channel (560), which may be a hardware/software link to a storage device which would store the encoded video data. The transmitter (540) may merge coded video data from the video coder (503) with other data to be transmitted, for example, coded audio data and/or ancillary data streams (sources not shown).

The controller (550) may manage operation of the video encoder (503). During coding, the controller (550) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (503) may perform coding operations according to a predetermined video coding technology or standard, such as ITU-T Rec. H.265. In its operation, the video encoder (503) may perform various compression operations, including predictive coding operations that exploit temporal and spatial redundancies in the input video sequence. The coded video data, therefore, may conform to a syntax specified by the video coding technology or standard being used.

In an embodiment, the transmitter (540) may transmit additional data with the encoded video. The source coder (530) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 6:
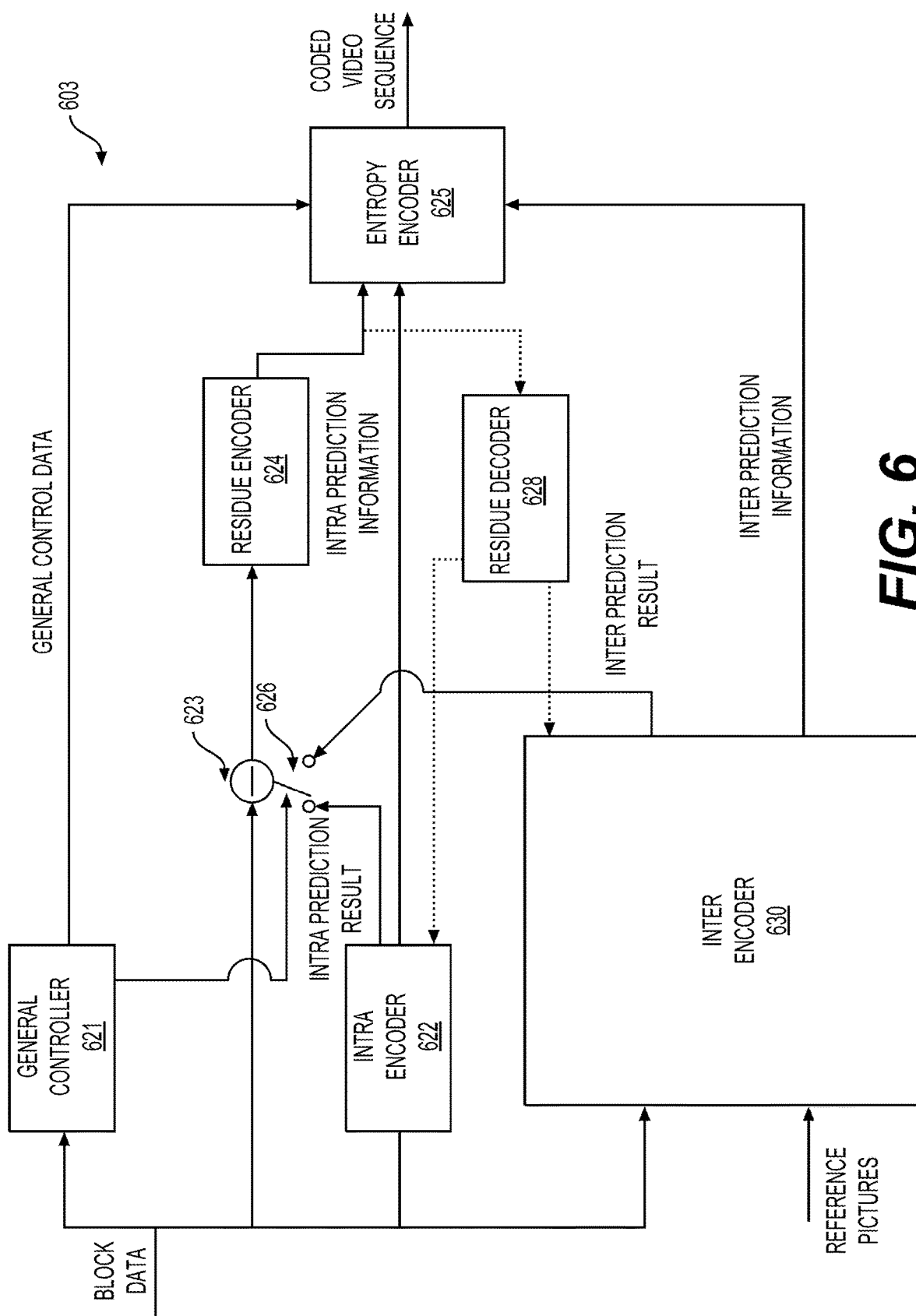
FIG. 6 shows a block diagram of an encoder in accordance with another embodiment.

FIG. 6 shows a diagram of a video encoder (603) according to another embodiment of the disclosure. The video encoder (603) is configured to receive a processing block (e.g., a prediction block) of sample values within a current video picture in a sequence of video pictures, and encode the processing block into a coded picture that is part of a coded video sequence. In an example, the video encoder (603) is used in the place of the video encoder (303) in the FIG. 3 example.

In an HEVC example, the video encoder (603) receives a matrix of sample values for a processing block, such as a prediction block of 8×8 samples, and the like. The video encoder (603) determines whether the processing block is best coded using intra mode, inter mode, or bi-prediction mode using, for example, rate-distortion optimization. When the processing block is to be coded in intra mode, the video encoder (603) may use an intra prediction technique to encode the processing block into the coded picture; and when the processing block is to be coded in inter mode or bi-prediction mode, the video encoder (603) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (603) includes other components, such as a mode decision module (not shown) to determine the mode of the processing blocks.

In the FIG. 6 example, the video encoder (603) includes the inter encoder (630), an intra encoder (622), a residue calculator (623), a switch (626), a residue encoder (624), a general controller (621), and an entropy encoder (625) coupled together as shown in FIG. 6.

The inter encoder (630) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (622) is configured to receive the samples of the current block (e.g., a processing block), in some cases compare the block to blocks already coded in the same picture, generate quantized coefficients after transform, and in some cases also intra prediction information (e.g., an intra prediction direction information according to one or more intra encoding techniques). In an example, the intra encoder (622) also calculates intra prediction results (e.g., predicted block) based on the intra prediction information and reference blocks in the same picture.

The general controller (621) is configured to determine general control data and control other components of the video encoder (603) based on the general control data. In an example, the general controller (621) determines the mode of the block, and provides a control signal to the switch (626) based on the mode. For example, when the mode is the intra mode, the general controller (621) controls the switch (626) to select the intra mode result for use by the residue calculator (623), and controls the entropy encoder (625) to select the intra prediction information and include the intra prediction information in the bitstream; and when the mode is the inter mode, the general controller (621) controls the switch (626) to select the inter prediction result for use by the residue calculator (623), and controls the entropy encoder (625) to select the inter prediction information and include the inter prediction information in the bitstream.

The residue calculator (623) is configured to calculate a difference (residue data) between the received block and prediction results selected from the intra encoder (622) or the inter encoder (630). The residue encoder (624) is configured to operate based on the residue data to encode the residue data to generate the transform coefficients. In an example, the residue encoder (624) is configured to convert the residue data from a spatial domain to a frequency domain, and generate the transform coefficients. The transform coefficients are then subject to quantization processing to obtain quantized transform coefficients. In various embodiments, the video encoder (603) also includes a residue decoder (628). The residue decoder (628) is configured to perform inverse-transform, and generate the decoded residue data. The decoded residue data can be suitably used by the intra encoder (622) and the inter encoder (630). For example, the inter encoder (630) can generate decoded blocks based on the decoded residue data and inter prediction information, and the intra encoder (622) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (625) is configured to format the bitstream to include the encoded block. The entropy encoder (625) is configured to include various information according to a suitable standard, such as the HEVC standard. In an example, the entropy encoder (625) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 7:
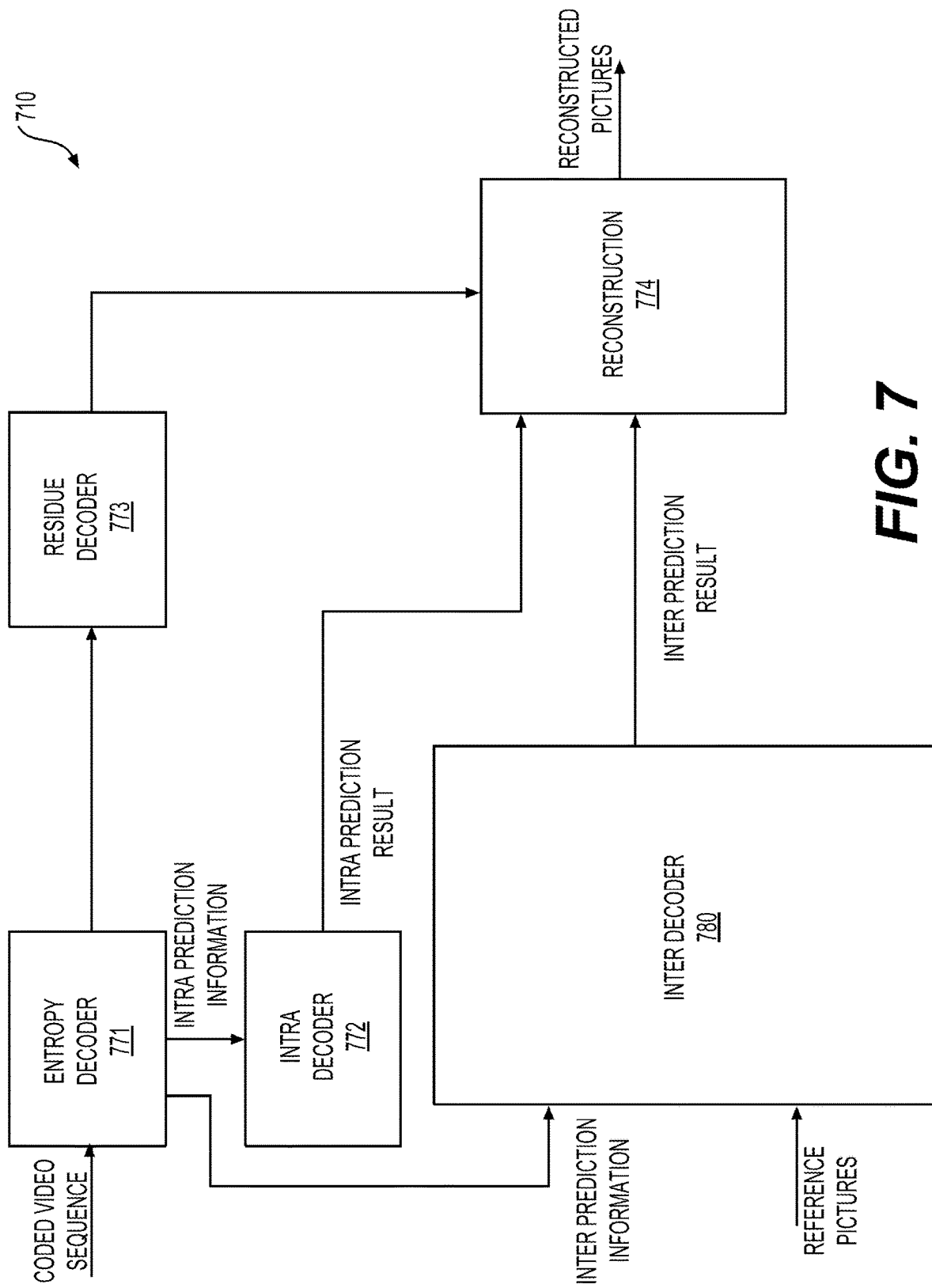
FIG. 7 shows a block diagram of a decoder in accordance with another embodiment.

FIG. 7 shows a diagram of a video decoder (710) according to another embodiment of the disclosure. The video decoder (710) is configured to receive coded pictures that are part of a coded video sequence, and decode the coded pictures to generate reconstructed pictures. In an example, the video decoder (710) is used in the place of the video decoder (310) in the FIG. 3 example.

In the FIG. 7 example, the video decoder (710) includes an entropy decoder (771), an inter decoder (780), a residue decoder (773), a reconstruction module (774), and an intra decoder (772) coupled together as shown in FIG. 7.

The entropy decoder (771) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode), prediction information (such as, for example, intra prediction information or inter prediction information) that can identify certain sample or metadata that is used for prediction by the intra decoder (772) or the inter decoder (780), respectively, residual information in the form of, for example, quantized transform coefficients, and the like. In an example, when the prediction mode is inter or bi-predicted mode, the inter prediction information is provided to the inter decoder (780); and when the prediction type is the intra prediction type, the intra prediction information is provided to the intra decoder (772). The residual information can be subject to inverse quantization and is provided to the residue decoder (773).

The inter decoder (780) is configured to receive the inter prediction information, and generate inter prediction results based on the inter prediction information.

The intra decoder (772) is configured to receive the intra prediction information, and generate prediction results based on the intra prediction information.

The residue decoder (773) is configured to perform inverse quantization to extract de-quantized transform coefficients, and process the de-quantized transform coefficients to convert the residual from the frequency domain to the spatial domain. The residue decoder (773) may also require certain control information (to include the Quantizer Parameter (QP)), and that information may be provided by the entropy decoder (771) (data path not depicted as this may be low volume control information only).

The reconstruction module (774) is configured to combine, in the spatial domain, the residual as output by the residue decoder (773) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (303), (503), and (603), and the video decoders (310), (410), and (710) can be implemented using any suitable technique. In an embodiment, the video encoders (303), (503), and (603), and the video decoders (310), (410), and (710) can be implemented using one or more integrated circuits. In another embodiment, the video encoders (303), (503), and (603), and the video decoders (310), (410), and (710) can be implemented using one or more processors that execute software instructions.

II. Inter Picture Prediction Modes

In various embodiments, a picture can be partitioned into blocks, for example, using a tree structure based partition scheme. The resulting blocks can then be processed according to different processing modes, such as an intra prediction mode, an inter prediction mode performed under a merge mode, skip mode, advanced motion vector prediction (AVMP) mode, and the like. An intra coded block can be a block that is coded with an intra prediction mode. In contrast, an inter coded block can be a bock that is processed with an inter prediction mode.

1. Merge Mode

When a currently processed block, referred to as a current block, is processed according to the merge mode, a merge candidate list for the current block can be constructed according to a set of spatially and/or temporally neighboring blocks. One of the motion information candidates in the merge candidate list can be selected for determining or deriving the motion information for the current block. A merge index indicating which candidate is selected can be signaled from an encoder to a decoder.

Figure 8:
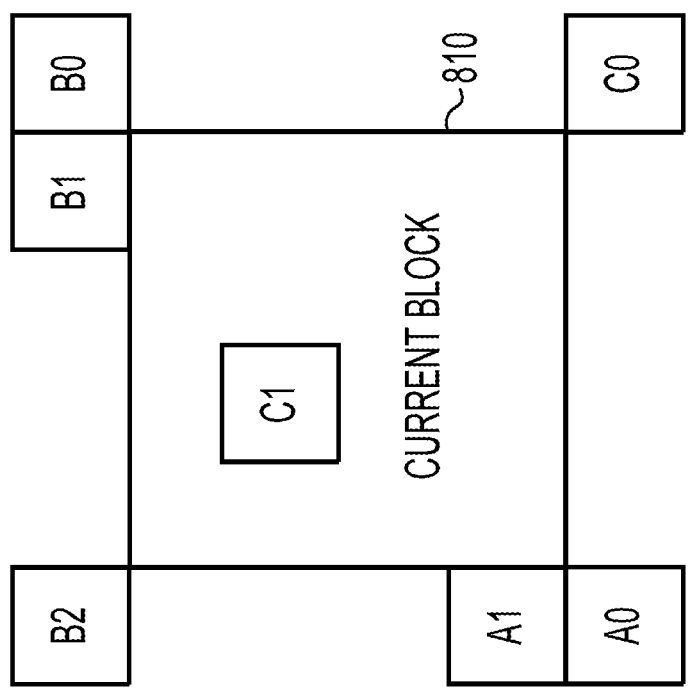
FIG. 8 is a schematic illustration of a current block and corresponding merge candidates derived from neighboring blocks according to a merge mode in accordance with an embodiment.

FIG. 8 is a schematic illustration of a current block and corresponding merge candidates derived from neighboring blocks according to a merge mode in accordance with an embodiment. In this example, a merge candidate list is to be constructed for a current block (810) that is to be processed according to the merge mode. A set of neighboring blocks, denoted A1, B1, B0, A0, B2, C0, and C1 are defined for the merge mode processing. Spatial candidates for constructing the merge candidate list can be determined according to spatially neighboring blocks A1, B1, B0, A0, and B2 that are in the same picture as the current block (810). Also, temporal candidates for constructing the merge candidate list can be determined according to temporal neighboring blocks C0 and C1, which correspond to blocks that are in another coded picture and neighbor or overlap a collocated block of the current block (810). In one example, the temporal neighboring block C1 can be located at a position corresponding to a position near (e.g., adjacent to) a center of the current block (810).

In some examples, the merge candidate list can have a predefined maximum number of merge candidates, represented as Cm. The merge candidates can be listed in the merge candidate list according to a certain order. In one example, according to a predefined order, a first number of merge candidates, Ca, can be derived from the spatially neighboring blocks according to the order {A1, B1, B0, A0, B2}, and a second number of merge candidates, Cb=Cm−Ca, can be derived from the temporally neighboring blocks according to the order {C0, C1}.

In some scenarios, candidate motion information from a particular neighboring block may be unavailable. For example, a neighboring block can be intra-predicted, outside of a slice or tile including the current block (810), or not in a same coding tree block (CTB) row as the current block (810). In some scenarios, candidate motion information from various neighboring blocks may be redundant. In some examples, the redundant merge candidate can be removed from the merge candidate list (e.g., by performing a pruning process). When a total number of available merge candidates (with redundant candidates being removed) in the merge candidate list is smaller than the maximum number of merge candidates Cm, one or more additional merge candidates can be added (e.g., according to a preconfigured rule) to fill the merge candidate list. For example, additional merge candidates can include combined bi-predictive candidates and/or zero motion vector candidates.

After the merge candidate list is constructed, at an encoder, an evaluation process can be performed to select a merge candidate from the merge candidate list. For example, rate-distortion (RD) performance corresponding to each merge candidate can be calculated, and the merge candidate with the best RD performance can be selected. Accordingly, a merge index associated with the selected merge candidate can be determined for the current block (810) and signaled to a decoder.

At a decoder, the merge index of the current block (810) can be received. A similar merge candidate list construction process, as described above, can be performed to generate a merge candidate list that is the same as the merge candidate list generated at the encoder side. After the merge candidate list is constructed, a merge candidate can be selected from the merge candidate list based on the received merge index without performing any further evaluations in some examples. Motion information of the selected merge candidate can be used for a subsequent motion-compensated prediction of the current block (810).

A skip mode is also introduced in some examples. For example, in the skip mode, a current block can be predicted using a merge mode as described above to determine a set of motion information, without introducing residue information. A skip flag can be associated with the current block. The skip flag and a merge index indicating the related motion information of the current block can be signaled to a video decoder. For example, at the beginning of a CU in an inter-picture prediction slice, a skip flag can be signaled that implies the following: the CU only contains one PU (2N×2N); the merge mode is used to derive the motion information; and no residual information is present in the bitstream. At the decoder side, based on the skip flag, a prediction block can be determined based on the merge index for decoding a respective current block without adding residue information. Thus, various methods for video coding with merge mode disclosed herein can be utilized in combination with a skip mode.

In some embodiments, a merge flag or a skip flag that is signaled in a bitstream can indicate whether the current block (810) is to be coded according to the merge mode. If the merge flag is set to be TRUE, a merge index can then be signaled to indicate which candidate in a merge candidate list will be used to provide motion information for the current block. In some embodiments, up to four spatial merge candidates (from four spatially neighboring blocks) and up to one temporal merge candidate (from one temporally neighboring block) can be added to the merge candidate list. A syntax MaxMergeCandsNum can be defined to indicate the size of the merge candidate list. The syntax MaxMergeCandsNum can be signaled in the bitstream.

2. Merge with Motion Vector Difference (MMVD) Mode

In some embodiments, a merge with motion vector difference (MMVD) mode is used for determining a motion vector predictor of a current block. The MMVD mode can be used when skip mode or merge mode is enabled. The MMVD mode reuses merge candidates in a merge candidate list of the skip mode or merge mode. For example, a merge candidate selected from the merge candidate list can be used to provide a starting point at a reference picture. A motion vector of the current block can be expressed with the starting point and a motion offset including a motion magnitude and a motion direction with respect to the starting point. At an encoder side, selection of the merge candidate and determination of the motion offset can be based on a search process (an evaluation process). At a decoder side, the selected merge candidate and the motion offset can be determined based on signaling from the encoder side.

In the MMVD mode, a selected merge candidate can be further refined by the signaled motion vector difference (MVD) information. In some embodiments, the MVD information includes a merge candidate flag, an index to specify motion magnitude, and an index for indication of motion direction. In the MMVD mode, one of the candidates in the merge candidate list can be selected to be used as a MV basis. The merge candidate flag is signaled to specify which one is selected as the MV basis.

The distance index can be used to specify a predefined offset for a horizontal component or a vertical component of a starting point MV. For example, a plurality of predefined pixel distances are shown in Table 1 each associated with indices from 0 to 7. The pixel distance having an index of the distance index can be determined from the plurality of pixel distances, and used to provide the motion magnitude. An offset is added to either horizontal component or vertical component of starting MV. The relation of distance index and pre-defined offset is specified in Table 1.

TABLE 1

| Distance Index | | | | | | | | |
|---|---|---|---|---|---|---|---|---|
| Distance Index | 0 | 1 | 2 | 3 | 4 | 5 | 6 | 7 |
| Pixel Distance | 1/4-pel | 1/2-pel | 1-pel | 2-pel | 4-pel | 8-pel | 16-pel | 32-pel |

The direction index represents the direction of the MVD relative to the starting point. For example, four directions with indices from 00 to 11 (binary) are shown in Table 2. The direction with an index of the direction index can be determined from the four directions, and used to provide a direction of the motion offset with respect to the starting point.

TABLE 2

| Direction Index | | | | |
|---|---|---|---|---|
| Direction Index | 00 | 01 | 10 | 11 |
| x-axis | + | − | N/A | N/A |
| y-axis | N/A | N/A | + | − |

In some embodiments, the definition of the MVD direction can vary according to the information of one or more starting MVs. When the one or more starting MVs include an uni-prediction MV or bi-prediction MVs with both lists pointing to the same side of the current picture (i.e. POCs of two reference pictures are both larger than the POC of the current picture, or are both smaller than the POC of the current picture), the direction as identified according to Table 2 can be used to specify the direction of MV offset added to the starting MVs. When the one or more starting MVs are bi-prediction MVs with the two MVs pointing to the different sides of the current picture (i.e. the POC of one reference picture is larger than the POC of the current picture, and the POC of the other reference picture is smaller than the POC of the current picture), the direction as identified according to Table 2 can be used to add the MV offset for the list0 MV component and the opposite direction for the list1 MV component of the starting MVs.

Figure 9:
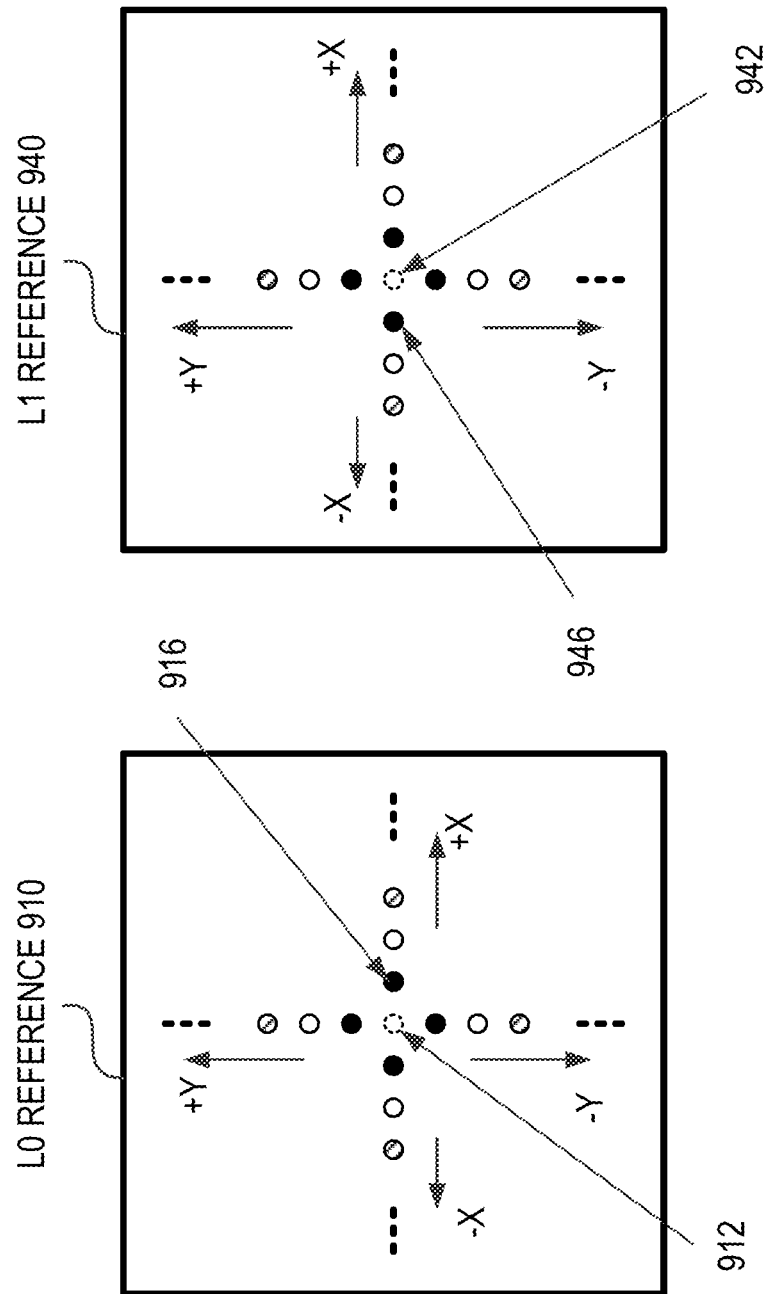
FIG. 9 is a schematic illustration of predetermined points surrounding two starting points that are to be evaluated in a merge mode with motion vector difference (MMVD) in accordance with an embodiment.

FIG. 9 is a schematic illustration of predetermined points surrounding two starting points that are to be evaluated in a merge mode with MMVD in accordance with an embodiment. In the example shown in FIG. 9, first and second motion vectors of a current block are associated with two reference pictures (910) and (940) in reference picture lists L0 and L1, respectively. Two starting points (912) and (942) can be determined in the reference pictures (910) and (940).

In an example at the encoding side, based on the starting points (912) and (942), multiple predefined points extending from the starting points (912) and (942) in vertical directions (represented by +Y, or −Y) or horizontal directions (represented by +X and −X) in the reference pictures (910) and (940) can be evaluated. Based on the evaluations, a merge candidate can be selected from the merge list, and a motion direction and a motion distance can also be determined. For example, based on the selected merge candidate, a base candidate index can be determined. Based on the selected motion vector predictor, such as that corresponding to the predefined point (e.g., 916 or 946), a direction and a distance of the point (e.g., 916 or 946) with respect to the starting point (912 or 942) can be determined. According to Table 1 and Table 2, a direction index and a distance index can accordingly be determined. In an example at the decoding side, based on the signaled starting point, direction, and distance, a refined motion vector according to MMVD can be determined.

3. Affine Prediction Mode

Figures 10A, 10B:
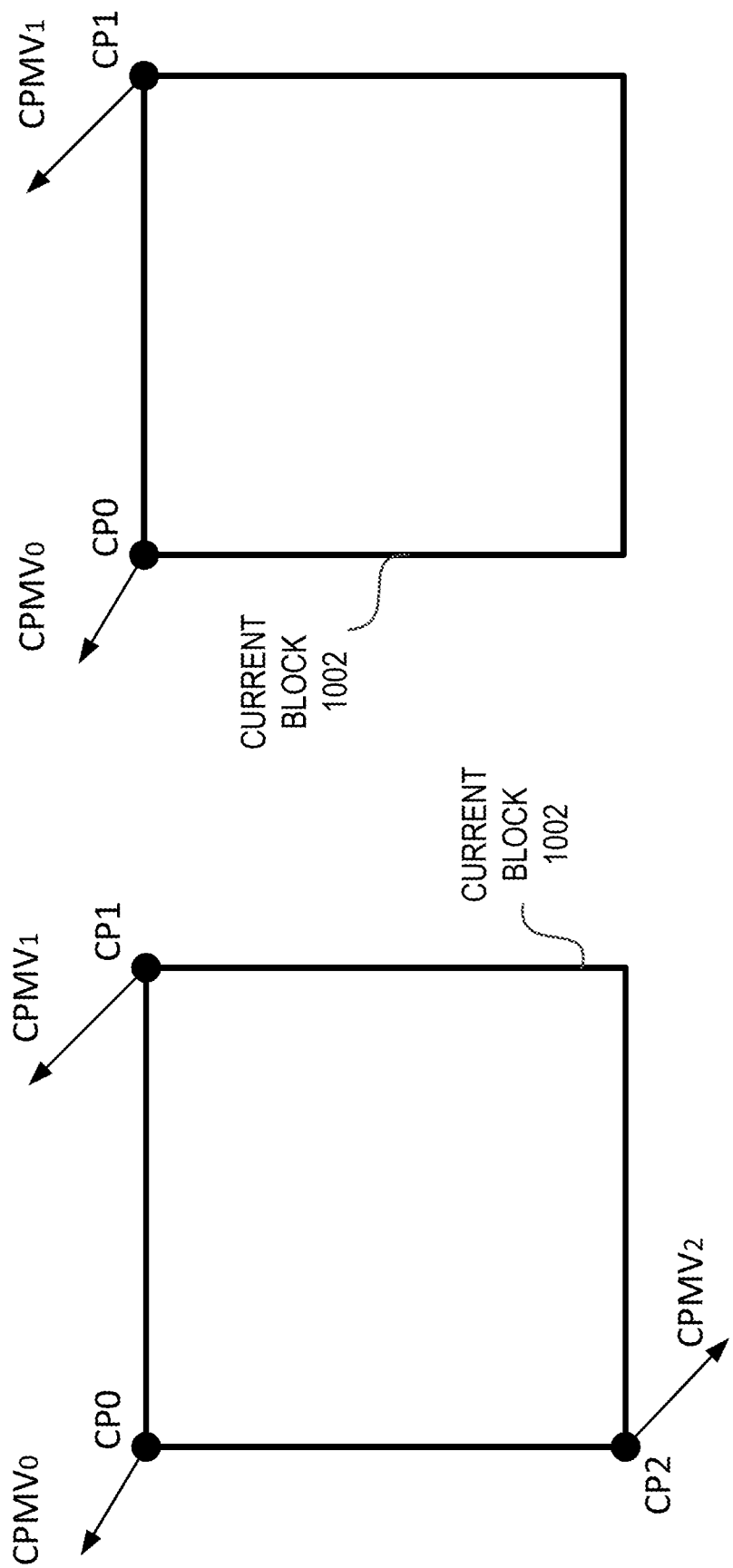
FIG. 10A is a schematic illustration of a 6-parameter affine model in accordance with an embodiment.
FIG. 10B is a schematic illustration of a 4-parameter affine model in accordance with an embodiment.

In some examples, a motion vector of a current block and/or sub-blocks of the current block can be derived using an affine model (e.g., a 6-parameter affine model or a 4-parameter affine model). FIG. 10A is a schematic illustration of a 6-parameter (according to three control points) affine model in accordance with an embodiment.

In an example, the 6 parameters of an affine coded block (e.g., current block 1002) can be represented by three motion vectors (also referred to as three control point motion vectors (CPMVs, e.g., CPMV$_0$, CPMV$_1$, and CPMV$_2$) at three different locations of the current block (e.g., control points CP0, CP1, and CP2 at upper-left, upper-right, and lower-left corners in FIG. 10A). In some embodiments, for the 6-parameter affine model, a motion vector at a sample location (x, y) in the current block (1002) can be derived as:

$$\begin{cases} mv_x = \dfrac{mv_{1x} - mv_{0x}}{W}x + \dfrac{mv_{2x} - mv_{0x}}{H}y + mv_{0x} \\ mv_y = \dfrac{mv_{1y} - mv_{0y}}{W}x + \dfrac{mv_{2y} - mv_{0y}}{H}y + my_{0y} \end{cases}, \quad \text{(Equation 1)}$$

where ($mv_{0x}$, $mv_{0y}$) represents a motion vector of the upper-left corner control point (CPMV$_0$), ($mv_{1x}$, $mv_{1y}$) represents a motion vector of the upper-right corner control point (CPMV$_1$), and ($mv_{2x}$, $mv_{2y}$) represents a motion vector of the lower-left corner control point (CPMV$_2$). Also, W represents a width of the current block (1002), and H represents a height of the current block (1002).

FIG. 10B is a schematic illustration of a 4-parameter (according to two control points) affine model in accordance with an embodiment. In another example, a simplified affine model uses four parameters to describe the motion information of an affine coded block (e.g., current block 1002), which can be represented by two motion vectors (also referred to as two CPMVs, e.g., CPMV$_0$ and CPMV$_1$) at two different locations of the current block (e.g., control points CP0 and CP1 at upper-left and upper-right corners in FIG.

10B). In some embodiments, for the 4-parameter affine model, a motion vector at a sample location (x, y) in the current block (1002) can be derived as:

$$\begin{cases} mv_x = \dfrac{mv_{1x} - mv_{0x}}{W}x + \dfrac{mv_{1x} - mv_{0x}}{W}y + mv_{0x} \\ mv_y = \dfrac{mv_{1y} - mv_{0y}}{W}x + \dfrac{mv_{1y} - mv_{0y}}{W}y + mv_{0y} \end{cases} \quad \text{(Equation 2)}$$

where ($mv_{0x}$, $mv_{0y}$) represents a motion vector of the upper-left corner control point ($CPMV_0$), and ($mv_{1x}$, $mv_{1y}$) represents a motion vector of the upper-right corner control point ($CPMV_1$). Also, W represents a width of the current block (1002).

Figure 10C:
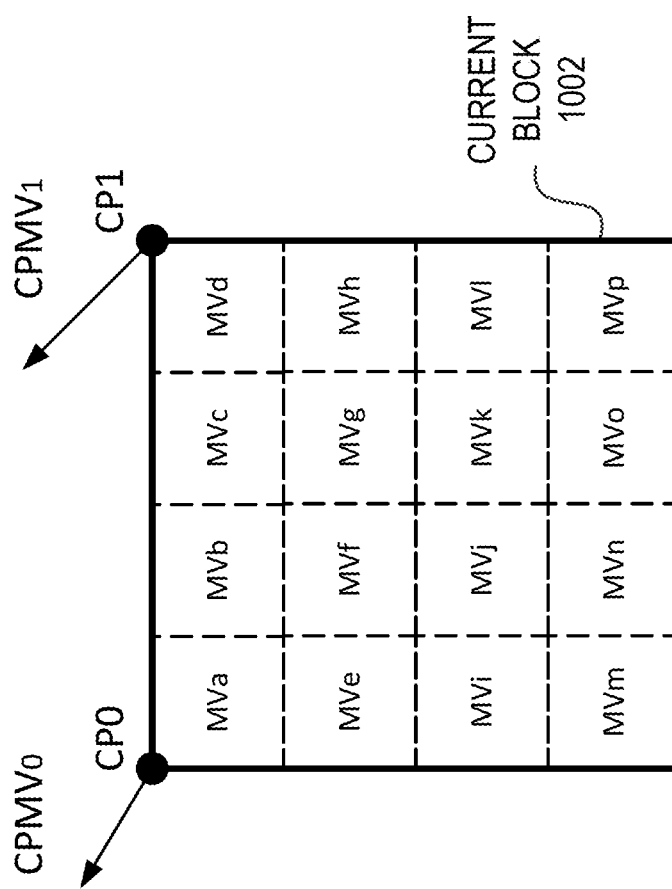
FIG. 10C is a schematic illustration of motion vectors derived for sub-blocks of a current block coded according to an affine prediction method in accordance with an embodiment.

In some embodiments, in order to simplify the motion compensation prediction, a subblock-based affine prediction method is applied. FIG. 10C is a schematic illustration of motion vectors derived for sub-blocks of a current block coded according to an affine prediction method in accordance with an embodiment. In FIG. 10C, the current block (1002) can be divided into sub-blocks. In this example, each sub-block can be a 4×4 luma sub-block. Sub-block motion vectors (MVa-MVp) corresponding to the centers of the respective sub-blocks can be calculated according to 4-parameter affine prediction method as described above, and rounded to 1/16 fraction accuracy for example. The motion compensation predicted block data for the sub-blocks can be generated according to the calculated sub-block motion vectors.

In some embodiments, the sub-block size of chroma-components can also be set to 4×4. The MV of a 4×4 chroma sub-block can be calculated as the average of the MVs of the four corresponding 4×4 luma sub-blocks.

In some embodiments, the CPMVs can be explicitly signaled. In some embodiments, the CPMVs can be determined according to various CPMV prediction methods, such as an affine merge mode or an affine AMVP mode.

3.1. Affine Merge Mode

Figure 11:
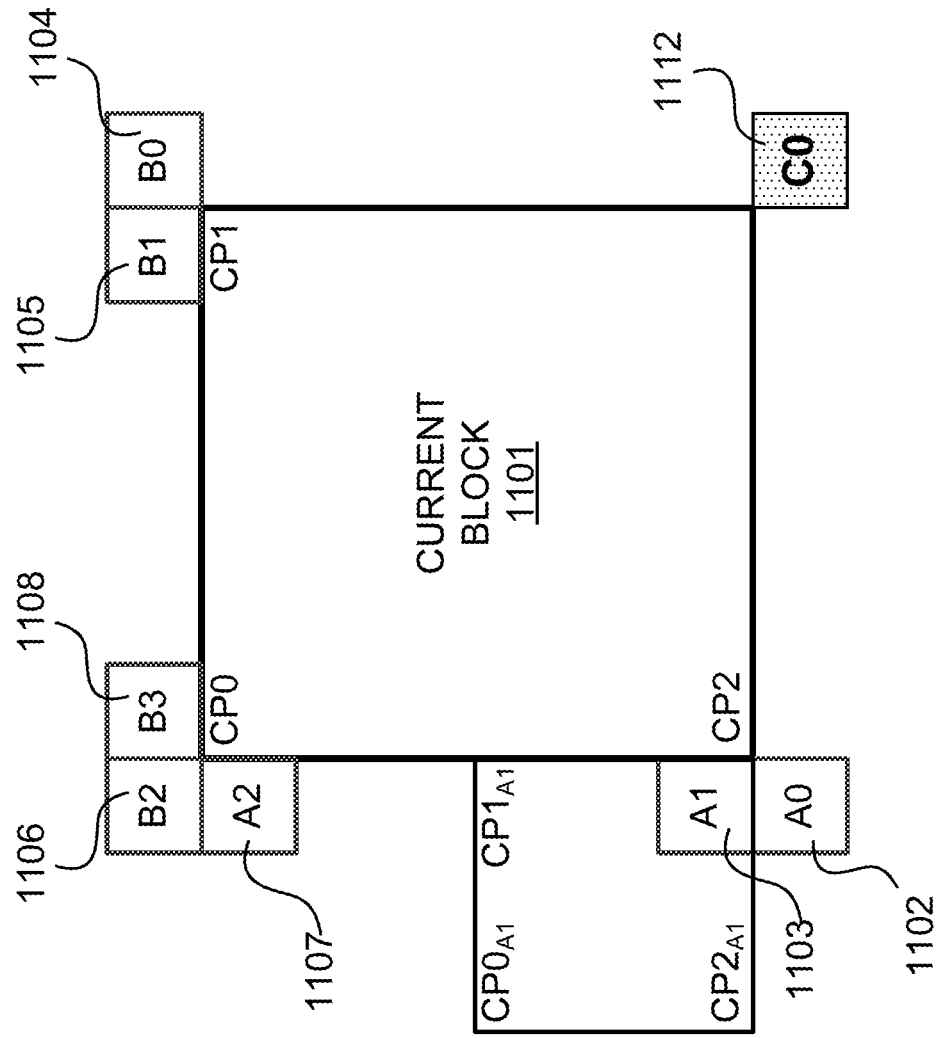
FIG. 11 is a schematic illustration of spatial neighboring blocks and a temporal neighboring block for a current block coded according to an affine prediction method in accordance with an embodiment.

FIG. 11 is a schematic illustration of spatial neighboring blocks and a temporal neighboring block for a current block (1101) coded according to an affine prediction method in accordance with an embodiment. As shown, the spatially neighboring blocks are denoted A0, A1, A2, B0, B1, B2, and B3 (1102, 1103, 1107, 1104, 1105, 1106, and 1108, respectively), and the temporally neighboring block is denoted C0 (1112). In some examples, the spatially neighboring blocks A0, A1, A2, B0, B1, B2, and B3 and the current block (1101) are in a same picture. In some examples, the temporally neighboring block C0 is in a reference picture and corresponds to a position outside the current block (1101) and adjacent to a lower-right corner of the current block (1101).

A list of motion information candidates (also referred to as an affine merge candidate list) can be constructed using an affine merge mode based on motion information of one or more of the spatial neighboring blocks and/or temporal neighboring blocks. In some examples, the affine merge mode can be applied when the current block (1101) has a width and height that are equal to or greater than 8 samples. According to the affine merge mode, the CPMVs of the current block (1101) can be determined based on the motion information candidates on the list. In some examples, the list of motion information candidates can include up to five CPMV candidates, and an index can be signaled to indicate which CPMV candidate is to be used for the current block. In some embodiments, a CPMV candidate includes all the CPMVs for an affine model.

In some embodiments, the affine merge candidate list can have three types of CPVM candidates, including inherited affine candidates, constructed affine candidates, and a zero MV. An inherited affine candidate can be derived by extrapolation from the CPMVs of the neighboring blocks. A constructed affine candidate can be derived using the translational MVs of the neighboring blocks.

In an example, there can be at most two inherited affine candidates, which are derived from corresponding affine motion models of the neighboring blocks, including one block from left neighboring blocks (A0 and A1) and one from upper neighboring blocks (B0, B1, and B2). For the candidate from the left, neighboring blocks A0 and A1 can be sequentially checked, and a first available inherited affine candidate from neighboring blocks A0 and A1 is used as the inherited affine candidate from the left. For the candidate from the top, neighboring blocks B0, B1, and B2 can be sequentially checked, and a first available inherited affine candidate from neighboring blocks B0, B1, and B2 is used as the inherited affine candidate from the top. In some examples, no pruning check is performed between the two inherited affine candidates.

When a neighboring affine block is identified, a corresponding inherited affine candidate to be added to the affine merge list of the current block (1101) can be derived from the control point motion vectors of the neighboring affine block. In the FIG. 11 example, if the neighboring block A1 is coded in affine mode, the motion vectors of the upper-left corner (control point $CP0_{A1}$), the upper-right corner (control point $CP1_m$), and the lower-left corner (control point $CP2_m$) of block A1 can be obtained. When block A1 is coded using a 4-parameter affine model, the two CPMVs as an inherited affine candidate of the current block (1101) can be calculated according to the motion vectors of control point $CP0_{A1}$ and control point $CP1_{A1}$. When block A1 is coded using a 6-parameter affine model, the three CPMVs as an inherited affine candidate of the current block (1101) can be calculated according to the motion vectors of control point $CP0_{A1}$, control point $CP1_m$, and control point $CP2_m$.

Moreover, a constructed affine candidate can be derived by combining the neighboring translational motion information of each control point. The motion information for the control points CP0, CP1, and CP2 is derived from the specified spatial neighboring blocks A0, A1, A2, B0, B1, B2, and B3.

For example, $CPMV_k$ (k=0, 1, 2, 3) represents the motion vector of four different control points, where $CPMV_0$ corresponds to control point CP0, $CPMV_1$ corresponds to control point CP1, $CPMV_2$ corresponds to control point CP2, and $CPMV_3$ corresponds to a temporal control point based on temporal neighboring block C0. For $CPMV_0$, neighboring blocks B2, B3, and A2 can be sequentially checked, and a first available motion vector from neighboring blocks B2, B3, and A2 is used as $CPMV_0$. For $CPMV_1$, neighboring blocks B1 and B0 can be sequentially checked, and a first available motion vector from neighboring blocks B1 and B0 is used as $CPMV_1$. For $CPMV_2$, neighboring blocks A1 and A0 can be sequentially checked, and a first available motion vector from neighboring blocks A1 and A0 is used as $CPMV_2$. Moreover, the motion vector of temporal neighboring block C0 can be used as $CPMV_4$, if available.

After $CPMV_0$, $CPMV_1$, $CPMV_2$, and $CPMV_3$, of four control points CP0, CP1, CP2 and the temporal control point are obtained, an affine merge candidate list can be constructed to include affine merge candidates that are constructed in an order of: {$CPMV_0$, $CPMV_1$, $CPMV_2$}, {$CPMV_0$, $CPMV_1$, $CPMV_3$}, {$CPMV_0$, $CPMV_2$, $CPMV_3$}, {CPMV$_1$, CPMV$_2$, CPMV$_3$}, {CPMV$_0$, CPMV$_1$}, and {CPMV$_0$, CPMV$_2$}. Any combination of three CPMVs can form a 6-parameter affine merge candidate, and any combination of two CPMVs can form a 4-parameter affine merge candidate. In some examples, in order to avoid a motion scaling process, if the reference indices of a group of control points are different, the corresponding combination of CPMVs can be discarded.

In some embodiments, after inherited affine merge candidates and constructed affine merge candidate are checked, if the list is still not full, zero MVs are inserted to the end of the list.

3.2. Affine AMVP Mode

In some embodiments, a list of motion information candidates can be constructed using an affine AMVP mode when the current block (1101) has a width and height that are equal to or greater than 16 samples. According to the affine AMVP mode, an affine flag in the CU level can be signaled in the bitstream to indicate whether affine AMVP mode is used, and then another flag can be signaled to indicate whether a 4-parameter affine or a 6-parameter affine model is used. In the affine AMVP mode, the difference of the CPMVs of the current block and corresponding CPMV predictors (CPMVPs) can be signaled in the bitstream. In some embodiments, an affine AVMP candidate list can has a size of two candidates is generated by using the following four types of CPVM candidate in order, including (1) inherited affine AMVP candidates that extrapolated from the CPMVs of one or more neighboring CUs; (2) constructed affine AMVP candidates that are derived using the translational MVs of one or more neighboring CUs; (3) translational MVs from one or more neighboring CUs; and (4) Zero MVs.

For deriving inherited affine AMVP candidates, in some examples, the checking order of inherited affine AMVP candidates is the same as the checking order of inherited affine merge candidates. The AVMP candidates can be determined only from the affine CUs that have the same reference picture as the current block. In some embodiments, no pruning process is applied when inserting an inherited affine motion predictor into the candidate list.

For deriving constructed affine AMVP candidates, in some examples, the constructed AMVP candidate can be derived from one or more neighboring blocks as shown in FIG. 11 with the same checking order that is used during the affine merge candidate construction. In addition, the reference picture indices of the neighboring blocks are also checked. For example, the first block in the checking order that is inter coded and has the same reference picture as the current block can be used. In some embodiments, there can be only one constructed affine AMVP candidate. In some embodiments, when the current block is coded according to a 4-parameter affine mode, and the control point motion vectors of a checked neighboring block corresponding to CP0 and CP1 thereof are both available, a collection of these control point motion vectors of the checked neighboring block can be added as a candidate in the affine AMVP list. When the current block is coded according to a 6-parameter affine mode, and the control point motion vectors of a checked neighboring block corresponding to CP0, CP1, and CP2 thereof are all available, a collection of these control point motion vectors of the checked neighboring block can be added as a candidate in the affine AMVP list. Otherwise, the constructed AMVP candidate from the checked neighboring block can be determined as unavailable.

In some embodiments, if the affine AVMP candidate list has less than two candidates after checking the inherited affine AMVP candidates and constructed AMVP candidates, a candidate derived according to translational MVs from one or more neighboring blocks can be added to the affine AVMP candidate list. Finally, zero MVs can be used to fill the affine AVMP candidate list if the list is still not full.

4. Subblock-Based Temporal Motion Vector Prediction (SbTMVP) Mode

Figure 12A:
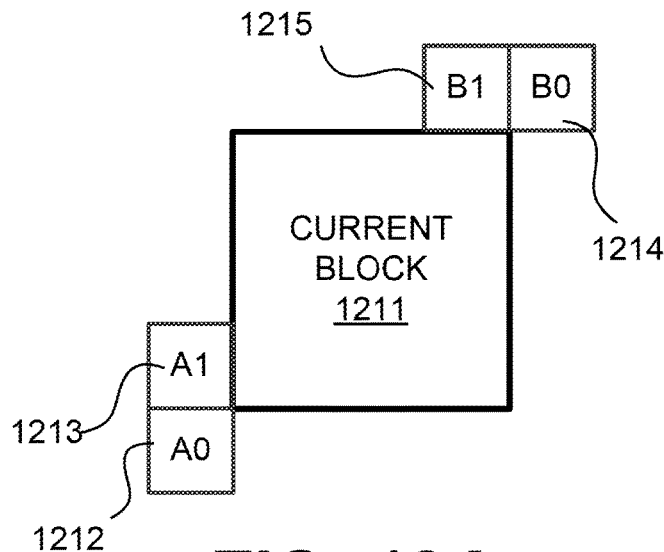
FIG. 12A is a schematic illustration of spatial neighboring blocks that can be used to determine predicted motion information for a current block using a subblock-based temporal motion vector prediction (SbTMVP) method in accordance with one embodiment.

FIG. 12A is a schematic illustration of spatial neighboring blocks that can be used to determine predicted motion information for a current block (1211) using a subblock-based temporal motion vector prediction (SbTMVP) method in accordance with one embodiment. FIG. 12A shows a current block (1211) and its spatial neighboring blocks denoted A0, A1, B0, and B1 (1212, 1213, 1214, and 1215, respectively). In some examples, spatial neighboring blocks A0, A1, B0, and B1 and the current block (1211) are in a same picture.

Figure 12B:
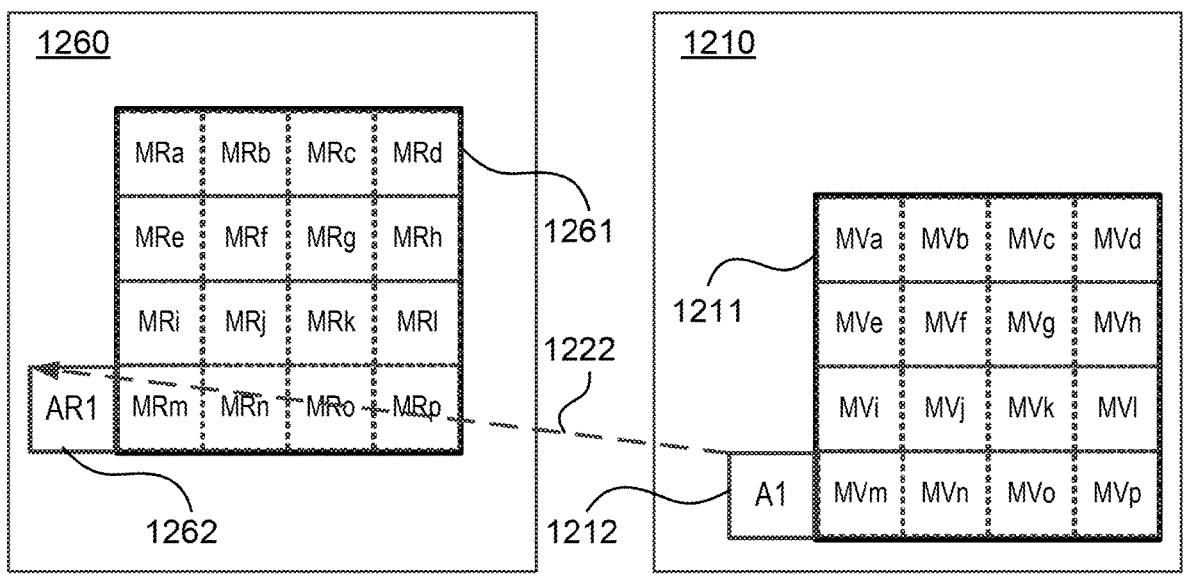
FIG. 12B is a schematic illustration of a selected spatial neighboring block for a SbTMVP method in accordance with one embodiment.

FIG. 12B is a schematic illustration for determining motion information for sub-blocks of the current block (1211) using the SbTMVP method based on a selected spatial neighboring block, such as block A1 for example, in accordance with an embodiment. In this example, the current block (1211) is in a current picture (1210), and a reference block (1261) is in a reference picture (1260) and can be identified based on a motion shift (or displacement) between the current block (1211) and the reference block (1261) indicated by a motion vector (1222).

In some embodiments, similar to a temporal motion vector prediction (TMVP) in HEVC, a SbTMVP uses the motion information in various reference sub-blocks in a reference picture for a current block in a current picture. In some embodiments, the same reference picture used by TMVP can be used for SbTVMP. In some embodiments, TMVP predicts motion information at a CU level but SbTMVP predicts motion at a sub-CU level. In some embodiments, TMVP uses the temporal motion vectors from a collocated block in the reference picture, which has a corresponding position adjacent to a lower-right corner or a center of a current block, and SbTMVP uses the temporal motion vectors from a reference block, which can be identified by performing a motion shift based on a motion vector from one of the spatial neighboring blocks of the current block.

For example, as shown in FIG. 12A, neighboring blocks A1, B1, B0, and A0 can be sequentially checked in a SbTVMP process. As soon as a first spatial neighboring block that has a motion vector that uses the reference picture (1260) as its reference picture is identified, such as block A1 having the motion vector (1222) that points to a reference block AR1 in the reference picture (1260) for example, this motion vector (1222) can be used for performing the motion shift. If no such motion vector is available from the spatial neighboring blocks A1, B1, B0, and A0, the motion shift is set to (0, 0).

After determining the motion shift, the reference block (1261) can be identified based on a position of the current block (1211) and the determined motion shift. In FIG. 12B, the reference block (1261) can be further divided into 16 sub-blocks with reference motion information MRa through MRp. In some examples, the reference motion information for each sub-block in the reference block (1261) can be determined based on a smallest motion grid that covers a center sample of the respective sub-block. The motion information can include motion vectors and corresponding reference indices. The current block (1211) can be further divided into 16 sub-blocks, and the motion information MVa through MVp for the sub-blocks in the current block (1211)

can be derived from the reference motion information MRa through MRp in a manner similar to the TMVP process, with temporal scaling in some examples.

The sub-block size used in the SbTMVP process can be fixed (or otherwise predetermined) or signaled. In some examples, the sub-block size used in the SbTMVP process can be 8×8 samples. In some examples, the SbTMVP process is only applicable to a block with a width and height equal to or greater than the fixed or signaled size, for example 8 pixels.

In an example, a combined sub-block based merge list which contains a SbTVMP candidate and affine merge candidates is used for the signaling of a sub-block based merge mode. The SbTVMP mode can be enabled or disabled by a sequence parameter set (SPS) flag. In some examples, if the SbTMVP mode is enabled, the SbTMVP candidate is added as the first entry of the list of sub-block based merge candidates, and followed by the affine merge candidates. In some embodiments, the maximum allowed size of the sub-block based merge list is set to five. However, other sizes may be utilized in other embodiments.

In some embodiments, the encoding logic of the additional SbTMVP merge candidate is the same as for the other merge candidates. That is, for each block in a P or B slice, an additional rate-distortion check can be performed to determine whether to use the SbTMVP candidate.

5. Sub-Block Based Merging Candidate List

In some standards, such as the VVC, a combined sub-block-based merging candidate list which contains both SbTVMP candidate and affine merge candidates can be used for the signaling of subblock-based merge mode. The SbTVMP mode can be enabled or disabled by a sequence parameter set (SPS) flag. In some embodiments, if the SbTMVP mode is enabled, the SbTMVP predictor can be added as the first entry of the list of subblock-based merge candidates, followed by the affine merge candidates. The size of subblock-based merge list can be signaled by the SPS. In some embodiments, the maximum allowed size of the subblock-based merge list can be set to 5 in VVC.

In some embodiments, the sub-block size used in SbTMVP is fixed to be 8×8. In some examples, similar to the implementation of the affine merge mode, the SbTMVP mode can be only applicable to the CU with both width and height greater than or equal to 8.

6. Combined Inter and Intra Prediction (CIIP)

In some embodiments, when a CU is coded in merge mode, and if the CU contains at least 64 luma samples (e.g., a product of the CU width times the CU height is equal to or greater than 64), an additional flag can be signaled to indicate if a combined inter and intra prediction (CIIP) mode is applied to the current CU. In some examples, the CIIP mode is also known as an example of a multi hypothesis prediction.

In some embodiments when the CIIP mode is applied, an intra prediction mode is first derived, where up to four possible intra prediction modes can be used, including a DC, planar, horizontal, or vertical mode. Afterwards, predicted samples for prediction blocks are derived according to the inter prediction and intra prediction signals, respectively (i.e., a set of inter predicted samples and a set of intra predicted samples), in a manner similar to regular intra and inter prediction processes. Finally, the set of inter predicted samples and the set of intra predicted samples can be combined according to a weighted averaging process to obtain a set of CIIP predicted samples.

6.1 Intra Prediction Mode Derivation

In an embodiment, up to 4 intra prediction modes, including the DC, Planar, Horizontal, and Vertical modes, can be used to predict the luma component in the CIIP mode. In some embodiments, if the CU shape is wide (e.g., the width of the CU is more than two times the height of the CU), the horizontal mode may not be allowed. In some embodiments, if the CU shape is narrow (e.g., the height of the CU is more than two times the width of the CU), the vertical mode may not be allowed.

In some embodiments, the CIIP mode can use three most probable modes (MPM) for intra prediction. The CIIP MPM candidate list can be formed as follows:

(i) The left and top neighboring blocks are set as A and B, respectively;
(ii) The intra prediction modes of block A and block B, denoted as intraModeA and intraModeB, respectively, are derived as follows:
  a. Let X be either A or B,
  b. intraModeX is set to DC if (1) block X is not available; or (2) block X is not predicted using the CIIP mode or the intra mode; or (3) block X is outside of the current CTU, and
  c. Otherwise, intraModeX is set to (1) DC or Planar if the intra prediction mode of block X is DC or Planar; or 2) Vertical if the intra prediction mode of block X is a "Vertical-like" angular mode (e.g., having a mode number greater than 34 in some examples where 66 angular modes are implemented), or (3) Horizontal if the intra prediction mode of block X is a "Horizontal-like" angular mode (e.g., having a mode number less than or equal to 34 in some examples where 66 angular modes are implemented);
(iii) If intraModeA and intraModeB are the same:
  a. If intraModeA is Planar or DC, then the three MPMs are set to {Planar, DC, Vertical} in that order, and
  b. Otherwise, the three MPMs are set to {intraModeA, Planar, DC} in that order; and
(iv) Otherwise (intraModeA and intraModeB are different):
  a. The first two MPMs are set to {intraModeA, intraModeB} in that order, and
  b. Uniqueness of Planar, DC, and Vertical is checked in that order against the first two MPM candidate modes; as soon as a unique mode is found, it is added as the third MPM.

In some embodiments, if the CU shape is wide or narrow as defined above, the MPM flag can be inferred to be 1 without signaling. Otherwise, an MPM flag can be signaled to indicate if the CIIP intra prediction mode is being used.

In some embodiments, if the MPM flag is 1, an MPM index can be further signaled to indicate which one of the MPM candidate modes is used in the CIIP intra prediction. Otherwise, if the MPM flag is 0, the intra prediction mode can be set to a "missing mode" among the MPM candidates described above that is not included in the MPM candidate list. For example, since four possible intra prediction modes are considered in the CIIP intra prediction mode, and the MPM candidate list contains only three intra prediction modes, one of the four possible modes can be the missing mode. For example, if the Planar mode is not in the MPM candidate list, then Planar is the missing mode, and the intra prediction mode can be set to Planar.

For the chroma components, the DM mode can be applied without additional signaling. Therefore, in some examples, chroma components use the same prediction mode as the corresponding luma components.

In some embodiments, the intra prediction mode of a CIIP-coded CU can be saved and used in the intra mode coding of the future neighboring CUs.

6.2 Combining Inter and Intra Predicted Samples

In an embodiment, the set of inter predicted samples in the CIIP mode $P_{inter}$ is derived using the same inter prediction process applied to regular merge mode, and the set of intra predicted samples $P_{intra}$ is derived using the CIIP intra prediction mode following the regular intra prediction process. Then, the intra and inter predicted samples can be combined using weighted averaging to obtain a set of CIIP predicted samples $P_{CIIP}$, where the weights can depend on the intra prediction mode and where the sample is located in the coding block.

In some embodiments, if the intra prediction mode is the DC or Planar mode, or if the block width or height is smaller than 4 pixels, equal weights can be applied to the set of intra predicted samples and the set of inter predicted samples. Otherwise, the weights can be determined based on the intra prediction mode (either Horizontal mode or Vertical mode in some cases) and the sample location in the block. For example, when the intra prediction mode is the Horizontal prediction mode, the coding block can be split into four equal-area parts of a size of (W/4)×H, W being the width of the block and H being the height of the block. Starting from the part closest to the intra prediction reference samples and ending at the part farthest away from the intra prediction reference samples, the weight wt for the set of intra predicted samples each of the 4 regions can be set to 6, 5, 3, and 2, respectively, with a total weight being 8. The weights for the Vertical mode are derived similarly but the coding block is split into four equal-area parts of a size of W×(H/4).

With the derived weight wt for the set of intra predicted samples, in this example, the combined CIIP prediction image can be derived according to:

$$P_{CIIP}((8-wT) \times P_{inter} + wt \times P_{int} + 4) >> 3. \quad \text{(Equation 3)}$$

7. Prediction Refinement Based on Local Illumination Compensation (LIC)

7.1 Local Illumination Compensation

Local illumination compensation (LIC) is a block level coding mode used in some embodiments. LIC may be enabled or disabled at a coding unit (CU) level in some examples.

LIC is based on a linear model for illumination changes, using a scaling factor α and an offset b. The LIC can be applied to inter-predicted samples of a block. A prediction by applying LIC can be generated according to:

$$\text{Pred}_{LIC} = a \cdot \text{Pred} + b, \quad \text{(Equation 4)}$$

where $\text{Pred}_{LIC}$ represents a predicted sample of the block after LIC is applied, Pred denotes the an inter-predicted sample before LIC is applied.

A final reconstruction of a pixel of the block using the LIC $\text{Rec}_{LIC}$ can be derived according to:

$$\text{Rec}_{LIC} = \text{Pred}_{LIC} + \text{Res} = a \cdot \text{Pred} + b + \text{Res}, \quad \text{(Equation 5)}$$

where Res is the residue (after de-quantization and inverse transform) corresponds to the pixel of the current block.

When the LIC mode is applied for a current block (such as a current CU, a block, or a sub-block), a least squares error method can be employed to derive the parameters a and b by using neighboring samples of the current block and their corresponding reference samples, for example according to $$\{a,b\} = \arg\min\{(\text{Rec}_{x,y} - \text{Ref}_{x',y'})^2\}, \quad \text{(Equation 6)}$$

where $\text{Rec}_{x,y}$ denotes the neighboring reconstructed samples of the current block, and $\text{Ref}_{x',y'}$ represents the corresponding neighboring samples of a reference block identified by a motion vector of the current block.

Figure 13:
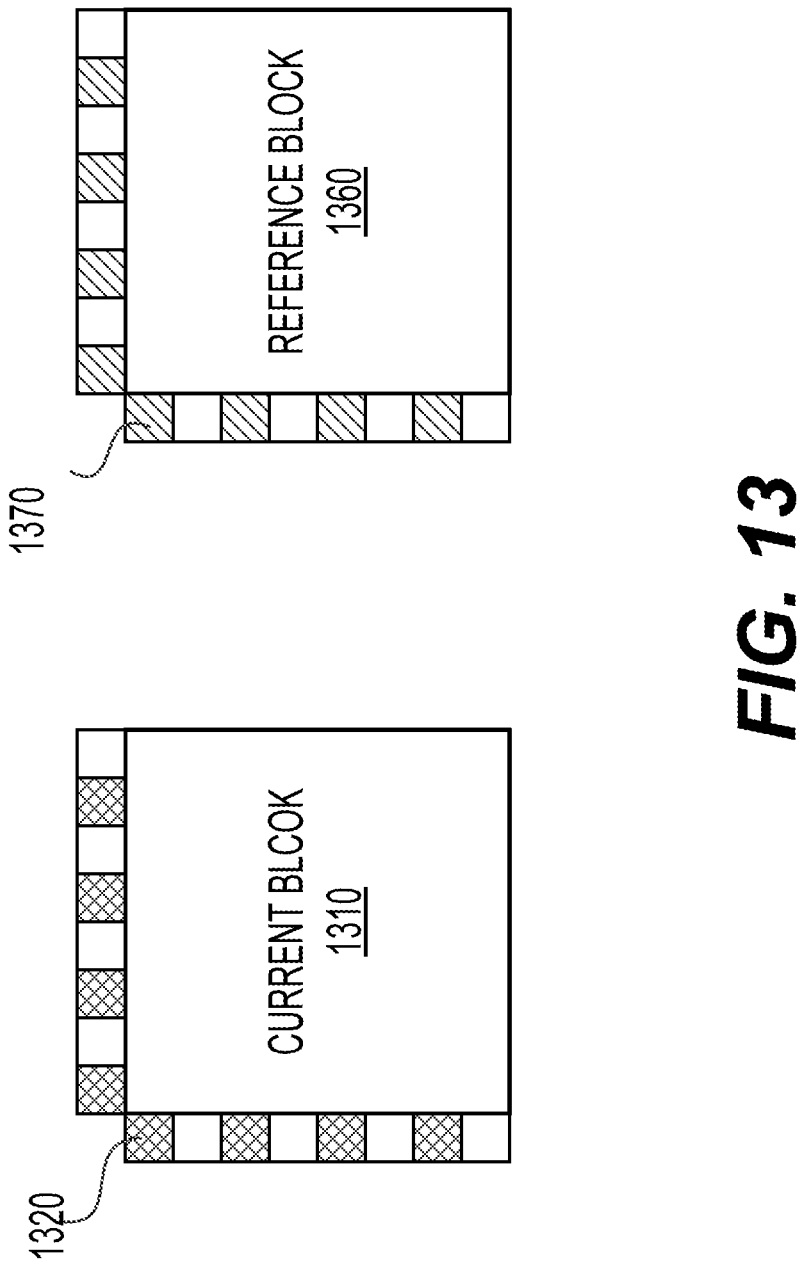
FIG. 13 shows an example of neighboring samples used for deriving local illumination compensation (LIC) parameters in accordance with one embodiment.

FIG. 13 shows an example of neighboring samples (1320, depicted as patterned regions) of a current block (1310) and neighboring samples (1370, depicted as patterned regions) of a corresponding reference block (1360) used for deriving the LIC parameters a and b in accordance with one embodiment. As shown in FIG. 13, the subsampled (2:1 subsampling) neighboring samples (1320) of the current block (1310) and the corresponding neighboring samples (1370) of the reference block (1360) in a reference picture are used. In some examples, the LIC parameters a and b can be derived and applied for each prediction direction separately.

In some examples, when a block (such as a CU) is coded with merge mode, an LIC flag can be copied from one or more of the neighboring blocks in a way similar to copying motion information in merge mode. In some examples, an LIC flag can be signaled for the block to indicate whether LIC is applied or not.

7.2 Uni-Directional Illumination Compensation

A modified method of LIC, referred to as uni-directional illumination compensation, is employed in some embodiments. For example, in the uni-directional illumination compensation, the linear model parameters derivation is kept unchanged. The modified LIC is applied on a CU basis. The modified LIC is not applied to subblock-based inter prediction (e.g., advance temporal motion vector prediction (ATMVP) or affine), triangular partition, multi-hypothesis prediction, and bi-directional prediction.

Figure 14:
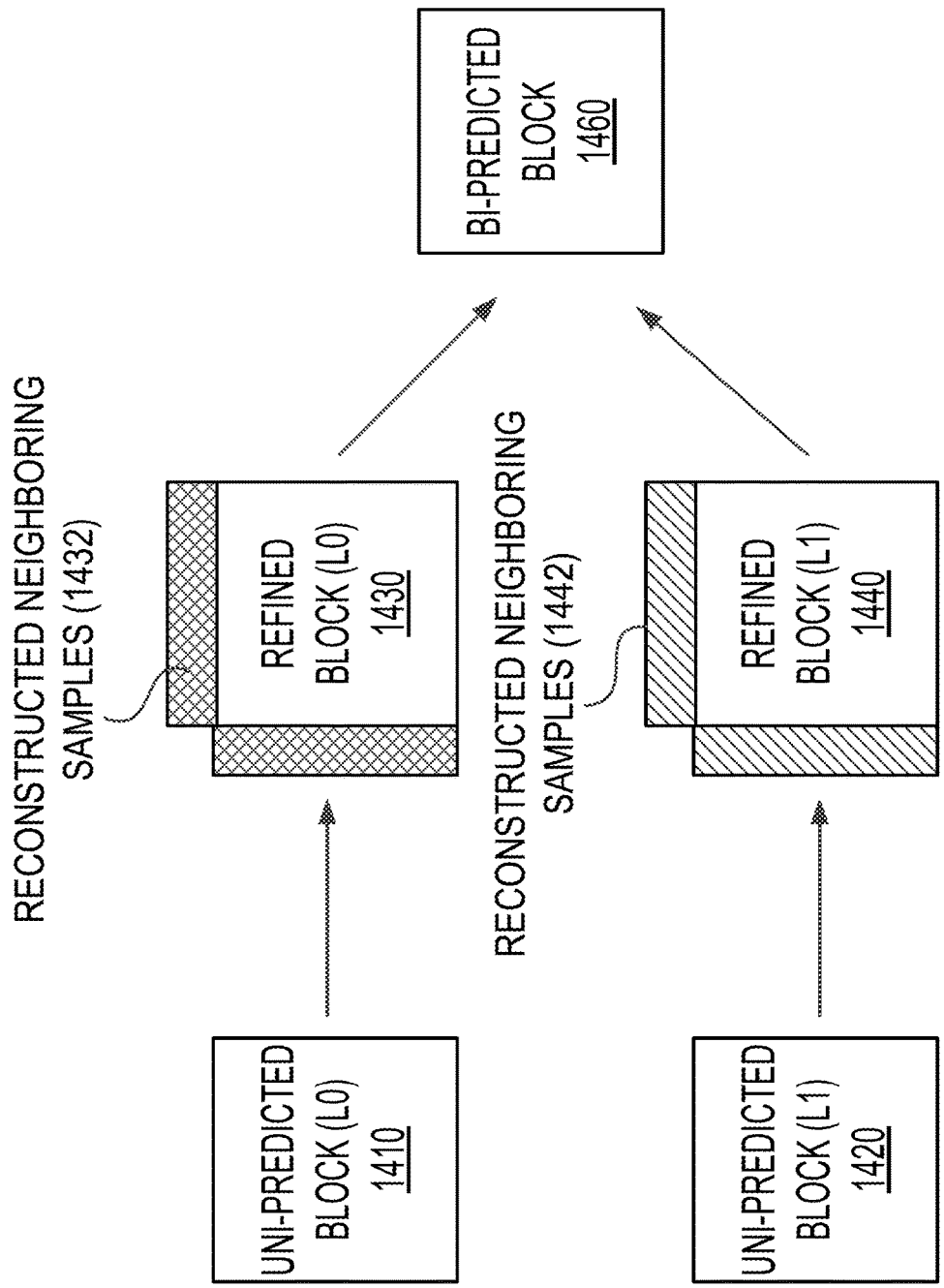
FIG. 14 shows an example when LIC is used with bi-prediction in accordance with one embodiment.

FIG. 14 shows an example when LIC is used with bi-directional prediction in accordance with one embodiment. In FIG. 14, predicted samples of a current block from two respective prediction directions L0 and L1, also referred to as uni-predicted blocks (1410) and (1420) for the current block can first be obtained. Then, refined blocks (1430) and (1440) obtained by applying LIC to uni-predicted blocks (1410) and (1420), respectively, according to reconstructed neighboring samples ((1432) and (1442), depicted as patterned regions). Finally, a weighted average can be performed based on the refined blocks (1430) and (1440) to generate a bi-predicted block (1460).

In some other embodiments, the LIC process is not applied to a block that is coded according to the bi-directional prediction. One reason, in some examples, is that the reconstructed neighboring samples (e.g., (1432) and (1442) in FIG. 14) of the block may not be available for each uni-predicted blocks after the weighted average for bi-directional prediction is applied to the uni-predicted blocks. Another reason, in some examples, is that having LIC applied to bi-directional prediction may introduce an additional stage for performing the LIC process (e.g., the stage corresponding to the generation of the refined blocks (1430) and (1440)) before the weighted average stage.

Figure 15:
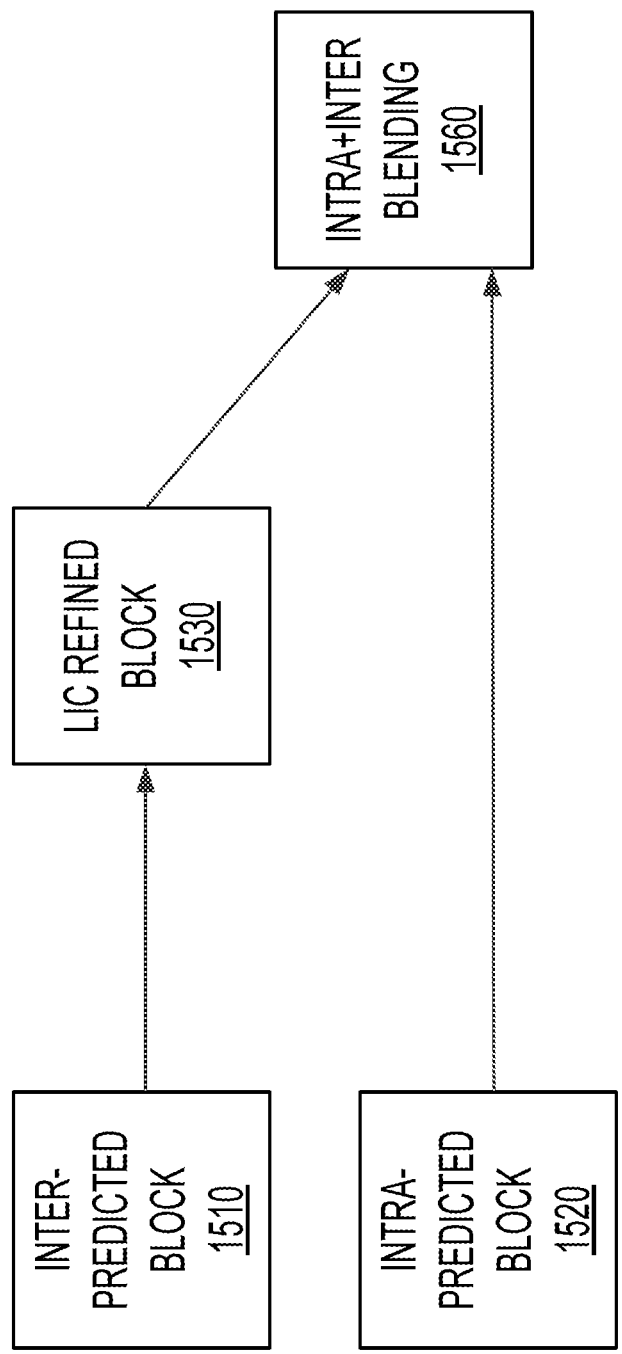
FIG. 15 shows an example when LIC is used with a combined inter and intra prediction (CIIP) in accordance with one embodiment.

FIG. 15 shows an example when LIC is used with CIIP in accordance with one embodiment. In some examples, the CIIP can also be referred to as a multi-hypothesis prediction. As shown in FIG. 15, an inter-predicted block (1510) and an intra-predicted block (1520) for a current block can first be generated. An LIC can be performed to obtain a refined block (1530) based on the inter-predicted block (1510). Finally, an inter-intra blended block (1560) for the current block can be generated by performing a weighted average to the intra-coded block (1520) and the refined block (1530).

In some other embodiments, the LIC process is not applied to a block that is coded according to the CIIP. One reason, in some examples, is that the LIC process is applied after the inter prediction and before the weighted average, which would delay the combination of the inter-predicted block and the intra-predicted block.

7.3 Applying LIC Processing for Affine Prediction

In some embodiments, the LIC can be applied to affine coded blocks. The LIC process can be applied to both luma and chroma components. In some examples, the process for derivation of linear model parameters as described above may still be used, and several methods can be applied for fetching reference samples of an affine coded CU.

Figure 16:
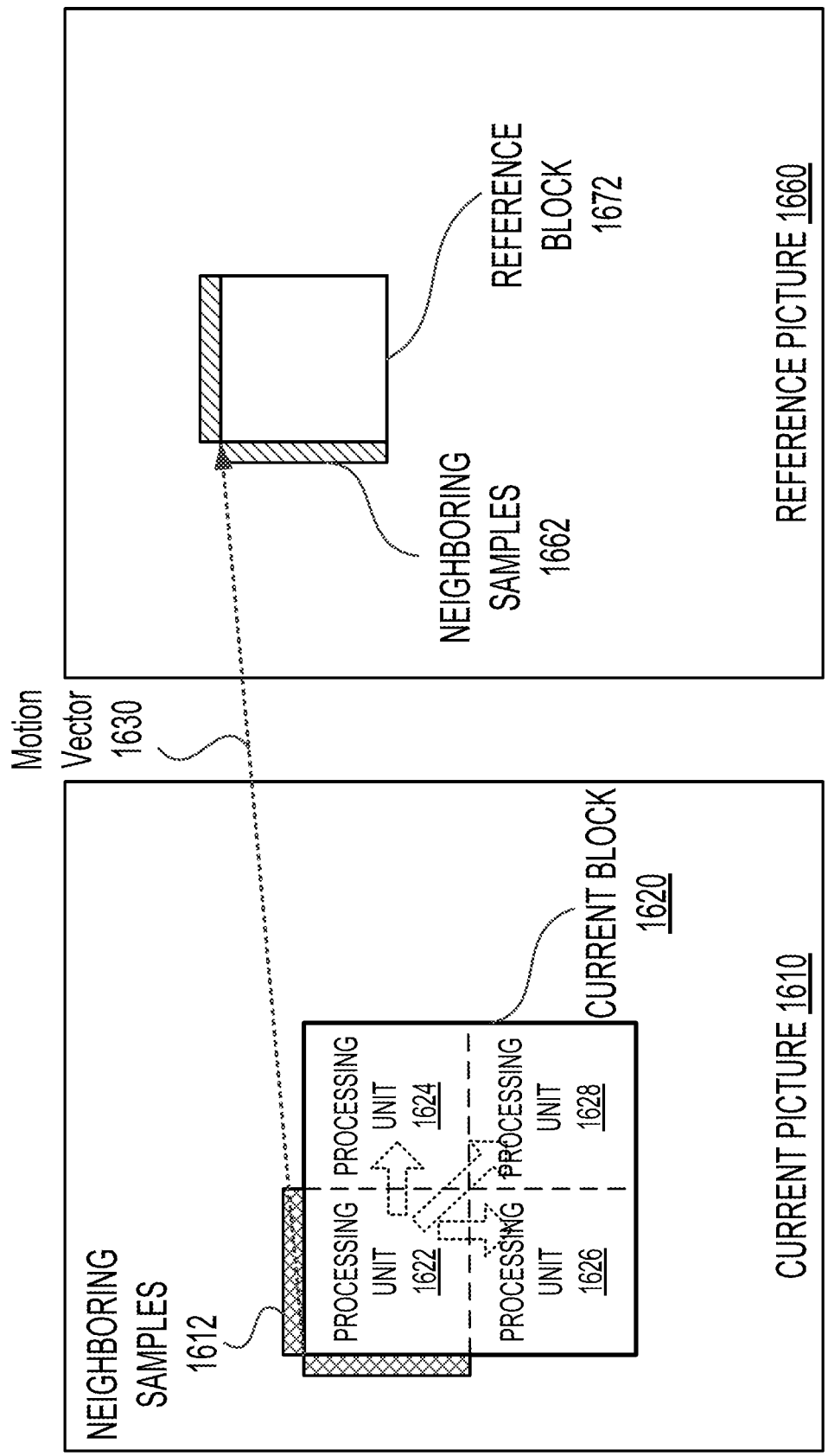
FIG. 16 shows an example of a first method for fetching reference samples in accordance with one embodiment.

FIG. 16 shows an example of a first method for fetching reference samples in accordance with one embodiment. A current block (1620) in a current picture (1610) can be an affine coded coding unit. The current block (1620) can include multiple 16×16 processing units or regions (e.g., four 16×16 processing units (1622), (1624), (1626), and (1628)). A reference block (1672) in a reference picture (1660) for an upper left 16×16 processing unit (1622) in the current picture (1610) can be identified by a motion vector (1630). The reference neighboring samples for derivation of linear model parameters for the LIC process can be fetched from the neighboring samples ((1612), depicted as patterned regions in FIG. 16) of the upper left 16×16 processing unit (1622) and the neighboring samples ((1662), depicted as patterned regions in FIG. 16) of the reference block (1672). The results of the linear model parameters derived based on the upper left 16×16 processing unit (1622) can be applicable to all other process units (e.g., processing units (1624), (1626), and (1628)) in the current block (1620).

FIG. 17 shows an example of a second method for fetching reference samples in accordance with one embodiment. A current block (1720) in a current picture (1710) can be a subblock-based affine coded coding unit. A co-located block (1770) of the current block (1720) is shown in a reference picture (1760). As shown in FIG. 17, sub-block MVs (graphically illustrated as co-located sub-blocks (A' to G') in combination with vectors MVa~MVg) for the top row sub-blocks and left column sub-blocks (A to G) of the current block (1720) can be used to identify corresponding reference blocks (A_Ref, to G_Ref) in the reference picture (1760). The reference neighboring samples for derivation of linear model parameters for the LIC process can be fetched from the neighboring samples (depicted as patterned regions in current picture (1710)) for the top row sub-blocks and left column sub-blocks (A to G) and the neighboring samples (depicted as patterned regions in reference picture (1760)) in the reference picture (1760).

In some examples, when the current block has a size greater than 16×16 samples, the top row sub-blocks and the left column sub-blocks of the current block can be limited within an upper left 16×16 sample region of the current block. The results of the linear model parameters derived based on the upper left 16×16 sample region can be applicable to all other process units in the current block.

7.4 LIC Flags

In some embodiments, an LIC flag can be included as a part of motion information in addition to MVs and reference indices in the merge mode. For example, when a merge candidate list is constructed, LIC flags can be inherited from the neighboring blocks that are included as merge candidates. In some examples, the LIC flags are not used for motion vector pruning for simplification purpose.

In some embodiments, the LIC flags are not stored in motion vector buffer of a reference picture, so the LIC flags can be set as "False" (or "Disabled") for TMVP mode. In an example, the LIC flags are set as "False" for bi-directional merge candidates (e.g., pair-wise average candidate and zero motion candidates). In some examples, when the LIC process is not applied, the LIC flags may be omitted and not signaled.

In some examples, the LIC flag can be signaled at a CU level. As an example, a syntax table (Table 3) showing a portion of syntax elements of a CU is provided below, with the LIC flag denoted as lic_flag.

TABLE 3

| Syntax Table of a CU (partial) | |
| --- | --- |
| coding_unit (x0, y0, cbWidth, cbHeight, treeType){ <br> ... <br>   if(CuPredMode[x0][y0] = = MODE_INTRA){ <br> ... <br>   }else if(treeType !=DUAL_TREE_CHROMA){/*MODE_INTER or MODE_IBC */ <br> ... <br>     if (slice_lic_enabled_flag && inter_pred_idc[x0][y0] ! = PRED_BI && <br> !general_merge_flag[x0][y0] && !pred_mode_ibc_flag && cbWidth * cbHeight >= 64) <br>       lic_flag [x0][y0] <br> ... <br>   } <br> ... <br> } | Descriptor <br><br><br><br><br><br><br><br> ae(v) |

III. Coding LIC Flag

1. Coding Syntax Element Representing LIC Flag Using CABAC

In some embodiments, the LIC flag can be coded using context-adaptive binary arithmetic coding (CABAC). In some examples, the LIC flag can be coded using a single context model. Therefore, the LIC flag can be coded as if it is independent of other information.

In some embodiments, to further improve coding efficiency, the LIC flag may be coded according to a context model selected from multiple candidate context models by taking advantage of the interdependency between the LIC flag and other available information.

In some applications, to break the dependency between the inter branch and the intra branch in a pipeline, neighboring reconstructed samples may be marked as unavailable if neighboring CUs are coded according to intra prediction, CIIP, or inter-block copying (IBC). When neighboring CUs have a root coded block flag (CBF) that is zero, the neighboring CUs can be coded solely according to predictions with no residue. Consequently, in some examples, it may be unlikely for the current block to apply the LIC process unless the MV difference between the current block and neighboring blocks is sufficiently large. In a case that the MV difference is not sufficiently large, an LIC scaling factor and an offset will likely be derived as 1 and 0, respectively, as the template (e.g., neighboring samples of the current block) and the reference samples of the reference block will likely be the same or substantially the same.

Figure 18:
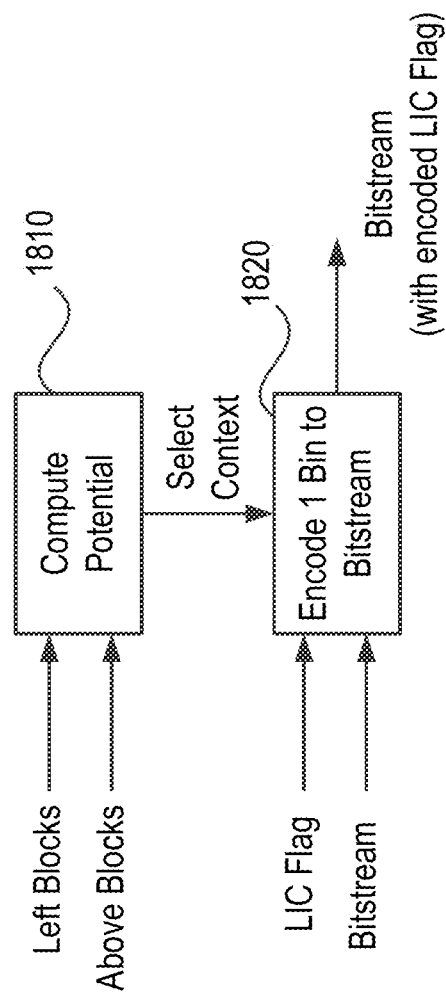
FIG. 18 shows a functional flow diagram of encoding a LIC flag in accordance with one embodiment.

Therefore, in some embodiments, which one of the multiple context models is applicable to coding of a bin of a syntax element representing the LIC flag can be selected according to a coding characteristic of a region neighboring the current block. For example, FIG. 18 shows a functional flow diagram of encoding a LIC flag in accordance with one embodiment. As shown in FIG. 18, at stage (1810), the potential that the application of LIC could improve the coding of the current block to a sufficient level can be first computed or evaluated according to the coding characteristic of the region neighboring the current block, such as one or more left blocks and/or one or more above blocks. In a case that there is sufficient potential for improvement, a first context model from the multiple context models can be used to code the LIC flag. In a case that there is no sufficient potential for improvement, a second context model from the multiple context models can be used to code the LIC flag. After a context model is selected, at stage (1820), a bitstream that includes encoded information of the current block and a LIC flag indicating whether the current block is coded with the LIC process can be received. Also, at stage (1820), a bin of a syntax element that represents the LIC flag can be encoded and incorporated into the bitstream for output.

In some examples, as shown in FIG. 17, the derivation of LIC parameters can be performed based on the top row of sub-blocks and/or the left column of sub-blocks in the current block. Consequently, the potential for improvement by applying LIC can also be evaluated based on the top row and/or the left column of sub-blocks of the current block. If any of the top row and/or the left column of sub-blocks of the current block is determined to meet one or more conditions, the sub-block is considered as having sufficient potential for improvement, and the current block is determined to have sufficient potential for improvement by applying the LIC. Otherwise, if none of top row and/or the left column of sub-blocks of the current block is found as having sufficient potential for improvement, the current block is determined to not have sufficient potential for improvement by applying the LIC.

The one or more conditions that can indicate sufficient potential improvement from applying the LIC process may include a group of conditions for the top row sub-blocks and/or another group of conditions for the left column sub-blocks. An upper-left corner sub-block may be checked if it meets both groups of conditions. The conditions may include a coding type of the respective sub-blocks.

In some embodiments, a first sub-block that is one of the top row sub-blocks is determined to have sufficient potential for improvement if and only if all of the following conditions are true for an above block neighboring an upper side of the first sub-block, including:
  the above block being in existence,
  the above block being coded with root CBF not zero,
  the above block being coded according to inter prediction, and
  the above block not being coded according to CIIP.

In some embodiments, a second sub-block that is one of the left column sub-blocks is determined to have sufficient potential for improvement if and only if all of the following conditions are true for a left block neighboring a left side of the second sub-block, including:
  the left block being in existence,
  the left block being coded with root CBF not zero,
  the left block being coded according to inter prediction, and
  the left block not being coded according to CIIP.

2. Decoding Process Example

Figure 19:
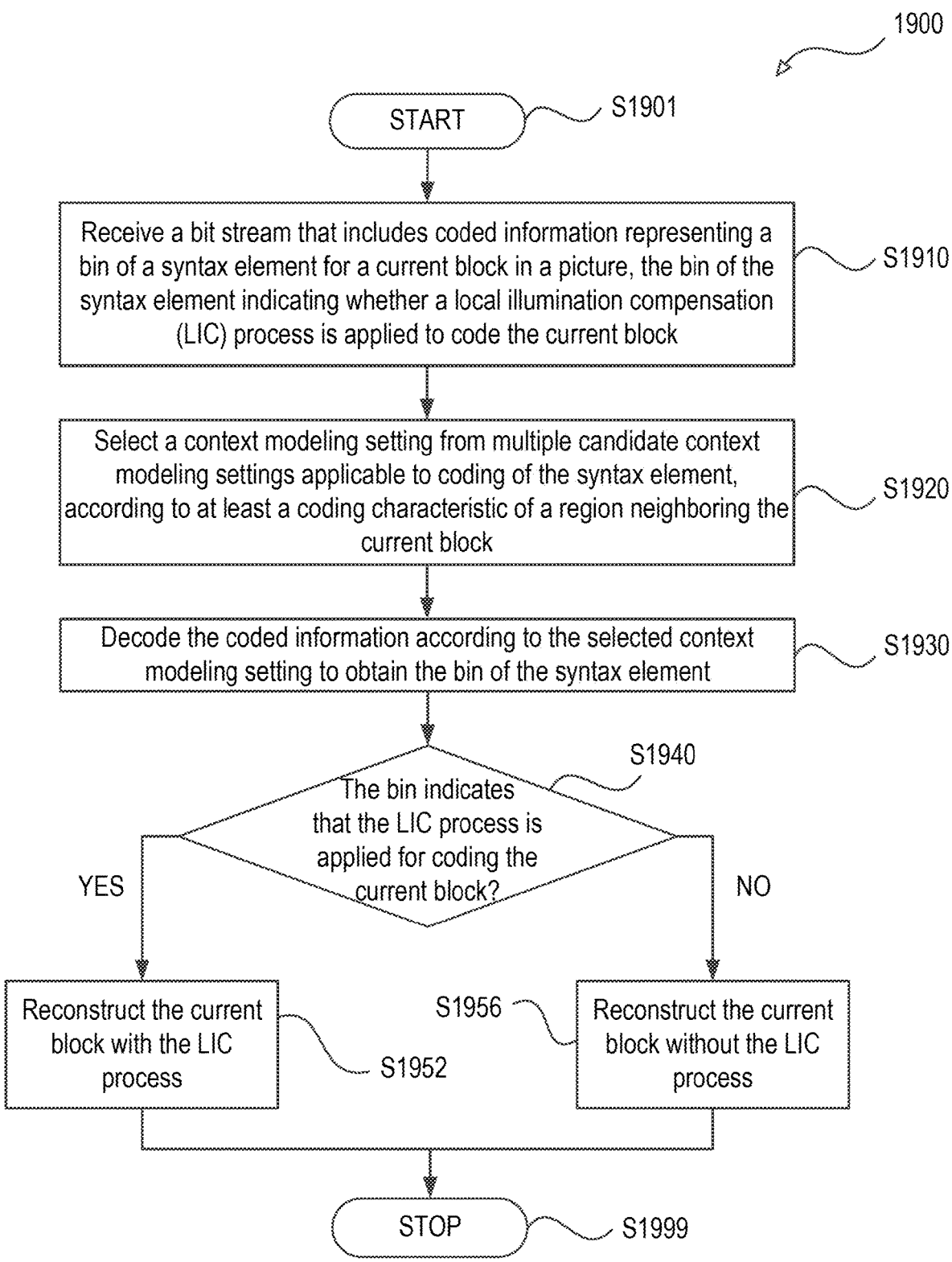
FIG. 19 shows a flow chart outlining a decoding process according to some embodiments of the disclosure.

FIG. 19 shows a flow chart outlining a decoding process according to some embodiments of the disclosure. The process (1900) can be used in the reconstruction of a block by decoding a LIC flag according to a context model selected from multiple candidate context models available to coding of the LIC flag. In various embodiments, the process (1900) is executed by processing circuitry, such as the processing circuitry in the terminal devices (210), (220), (230), and (240), the processing circuitry that performs functions of the video encoder (303), the processing circuitry that performs functions of the video decoder (310), the processing circuitry that performs functions of the video decoder (410), the processing circuitry that performs functions of the video encoder (503), and the like. In some embodiments, the process (1900) is implemented in software instructions, thus when the processing circuitry executes the software instructions, the processing circuitry performs the process (1900). The process starts at (S1901) and proceeds to (S1910).

At (S1910), a bit stream is received. The bit stream includes coded information representing a bin of a syntax element for a current block in a picture. The bin of the syntax element can indicate whether a LIC process is applied to code the current block.

At (S1920), a context model can be selected from multiple candidate context models applicable to coding of the syntax element, according to at least a coding characteristic of a region neighboring the current block.

In some embodiments, whether at least one of top row sub-blocks or left column sub-blocks of the current block meet one or more conditions for applying the LIC process can be determined. In some examples, a first one of the multiple candidate context models can be selected as the selected context model in response to the at least one of the top row sub-blocks or the left column sub-blocks being determined to meet the one or more conditions. In some examples, a second one of the multiple candidate context models can be selected as the selected context model in response to none of the top row sub-blocks and the left column sub-blocks being determined to meet the one or more conditions.

In some embodiments, the first one of the multiple candidate context models corresponds to a first probability of the bin indicating that a probability of applying the LIC process is higher than a probability of not applying the LIC process; and the second one of the multiple candidate context models corresponds to a second probability of the bin indicating that the probability of not applying the LIC process is higher than the probability of applying the LIC process.

In at least one example, each one of the multiple candidate context models is associated with a corresponding context incremental index (also known as ctxInc in some standards). The first one of the multiple candidate context models can be associated with a first context incremental index having a value of one of 0 and 1; and the second one of the multiple candidate context models can be associated with a second context incremental index having a value of the other one of 0 and 1.

In at least one embodiment, the one or more conditions may include, for a first sub-block that is one of the top row sub-blocks, an above block neighboring an upper side of the first sub-block being coded according to an inter prediction with no residue. The one or more conditions may also include, for a second sub-block that is one of the left column sub-blocks, a left block neighboring a left side of the second sub-block being coded according to the inter prediction with no residue.

In at least another embodiment, the one or more conditions may include, for a first sub-block that is one of the top row sub-blocks, an above block neighboring an upper side of the first sub-block being coded with root CBF not zero, the above block being coded according to an inter prediction, and the above block being not coded according to CIIP. The one or more conditions may also include, for a second sub-block that is one of the left column sub-blocks, a left block neighboring a left side of the second sub-block being coded with the root CBF not zero, the left block being coded according to the inter prediction, and the left block being not coded according to CIIP.

In some embodiments, the top row sub-blocks and the left column sub-blocks of the current block are within an upper left 16×16 sample region of the current block in a case that the current block has a size greater than 16×16 samples.

At (S1930), the coded information can be decoded according to the selected context model to obtain the bin of the syntax element.

At (S1940), whether the bin indicates that the LIC process is applied for coding the current block is determined. In response to the bin indicating that the LIC process is applied for coding the current block, the process proceeds to (S1952). In response to the bin indicating that the LIC process is not applied for coding the current block, the process proceeds to (S1956).

At (S1952), the current block is reconstructed by performing one or more decoding processes with the LIC process.

At (S1956), the current block is reconstructed by performing one or more decoding processes without the LIC process.

After (S1952) and (S1956), the process may proceed to (S1999) and terminates.

3. Encoding Process Example

Figure 20:
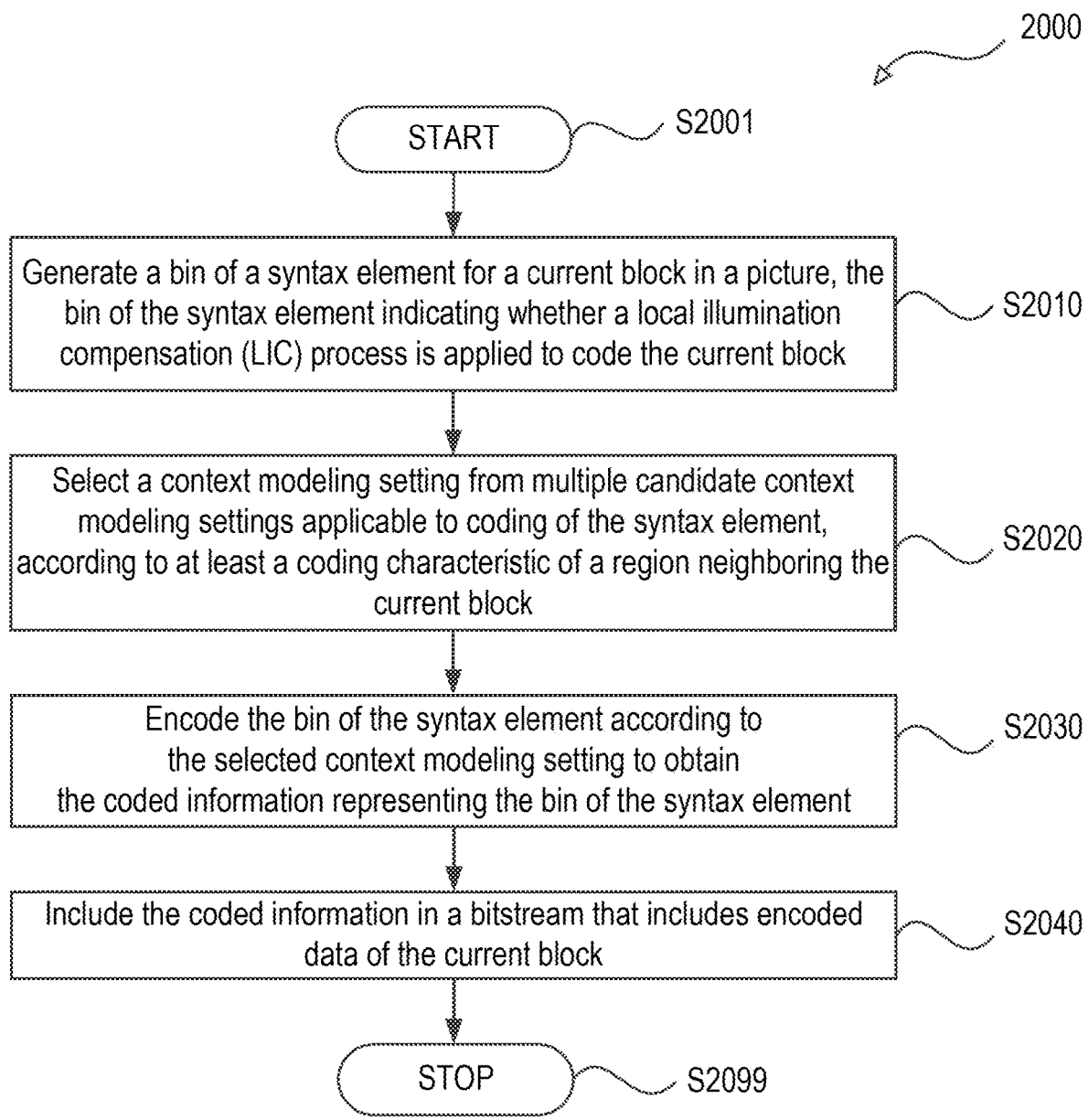
FIG. 20 shows a flow chart outlining an encoding process according to some embodiments of the disclosure.

FIG. 20 shows a flow chart outlining an encoding process according to some embodiments of the disclosure. The process (2000) can be used in the encoding of a block, including encoding a LIC flag according to a context model selected from multiple candidate context models available to coding of the LIC flag. In various embodiments, the process (2000) is executed by processing circuitry, such as the processing circuitry in the terminal devices (210), (220), (230), and (240), the processing circuitry that performs functions of the video encoder (303), the processing circuitry that performs functions of the video encoder (503), and the like. In some embodiments, the process (2000) is implemented in software instructions, thus when the processing circuitry executes the software instructions, the processing circuitry performs the process (2000). The process starts at (S2001) and proceeds to (S2010).

At (S2010), a bin of a syntax element for a current block in a picture is generated. The bin of the syntax element can indicate whether a LIC process is applied to code the current block.

At (S2020), a context model can be selected from multiple candidate context models applicable to coding of the syntax element, according to at least a coding characteristic of a region neighboring the current block. In some examples, (S2020) can be performed in a manner similar to (S1920) as illustrated with reference to FIG. 19.

At (S2030), the bin of the context element is encoded according to the selected context model to obtain the coded information.

At (S2040), the coded information is included in a bitstream that includes encoded data of the current block.

After (S2040), the process may proceed to (S2099) and terminates.

The embodiments described herein may be used separately or combined in any order. Further, each of the embodiments, encoder, and decoder may be implemented by processing circuitry (e.g., one or more processors or one or more integrated circuits). In one example, the one or more processors execute a program that is stored in a non-transitory computer-readable medium.

IV. Computer System

The techniques described above, can be implemented as computer software using computer-readable instructions and physically stored in one or more computer-readable media. For example, FIG. 21 shows a computer system (2100) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 21:
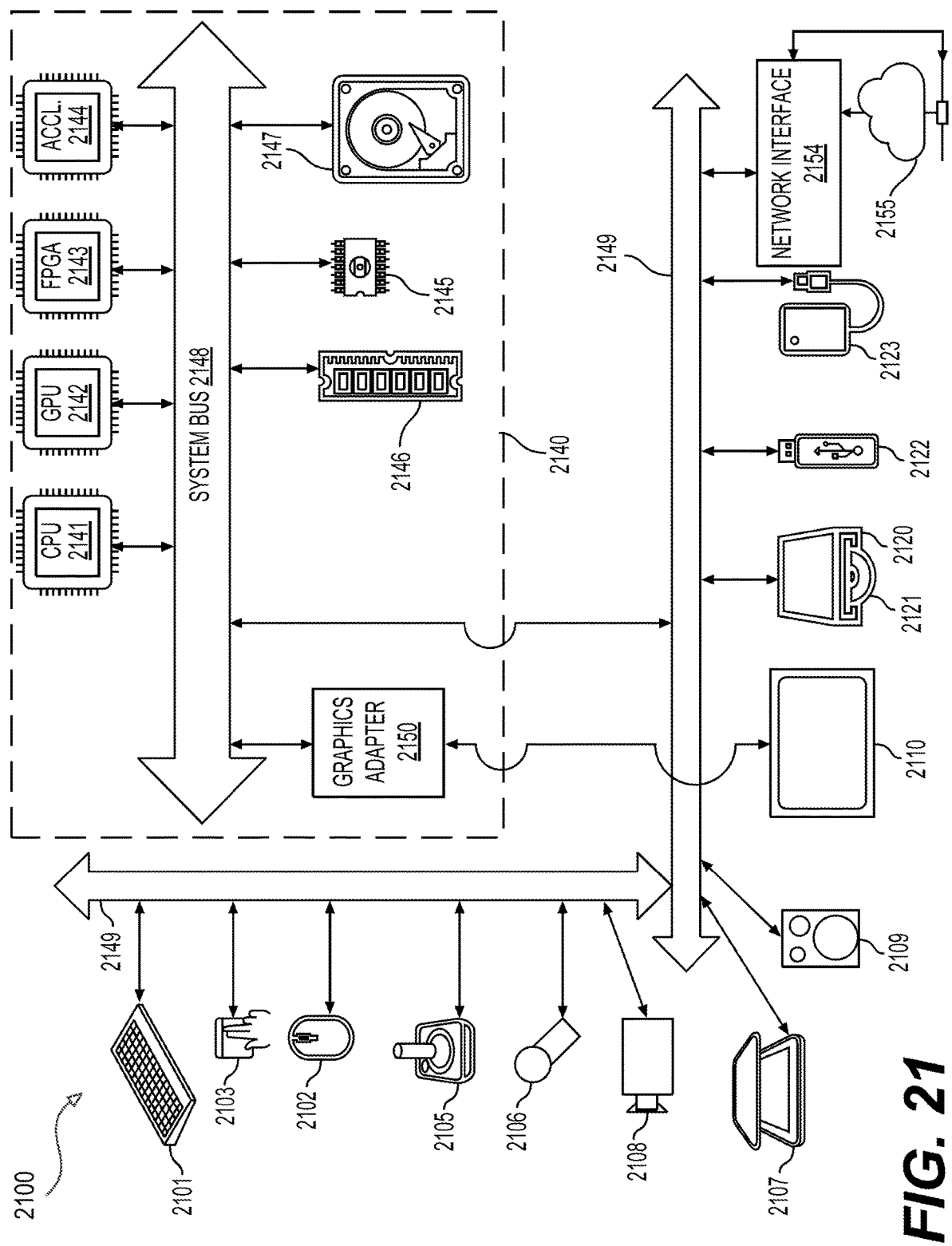
FIG. 21 is a schematic illustration of a computer system in accordance with an embodiment.

The components shown in FIG. 21 for computer system (2100) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (2100).

Computer system (2100) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (2101), mouse (2102), trackpad (2103), touch screen (2110), data-glove (not shown), joystick (2105), microphone (2106), scanner (2107), camera (2108).

Computer system (2100) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (2110), data-glove (not shown), or joystick (2105), but there can also be tactile feedback devices that do not serve as input devices), audio output devices (such as: speakers (2109), headphones (not depicted)), visual output devices (such as screens (2110) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (2100) can also include human accessible storage devices and their associated media such as optical media including CD/DVD ROM/RW (2120) with CD/DVD or the like media (2121), thumb-drive (2122), removable hard drive or solid state drive (2123), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (2100) can also include an interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (2149) (such as, for example USB ports of the computer system (2100)); others are commonly integrated into the core of the computer system (2100) by attachment to a system bus as described below (for example Ethernet interface into a PC computer system or cellular network interface into a smartphone computer system). Using any of these networks, computer system (2100) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (2140) of the computer system (2100).

The core (2140) can include one or more Central Processing Units (CPU) (2141), Graphics Processing Units (GPU) (2142), specialized programmable processing units in the form of Field Programmable Gate Areas (FPGA) (2143), hardware accelerators for certain tasks (2144), and so forth. These devices, along with Read-only memory (ROM) (2145), Random-access memory (2146), internal mass storage such as internal non-user accessible hard drives, SSDs, and the like (2147), may be connected through a system bus (2148). In some computer systems, the system bus (2148) can be accessible in the form of one or more physical plugs to enable extensions by additional CPUs, GPU, and the like. The peripheral devices can be attached either directly to the core's system bus (2148), or through a peripheral bus (2149). Architectures for a peripheral bus include PCI, USB, and the like.

CPUs (2141), GPUs (2142), FPGAs (2143), and accelerators (2144) can execute certain instructions that, in combination, can make up the aforementioned computer code. That computer code can be stored in ROM (2145) or RAM (2146). Transitional data can be also be stored in RAM (2146), whereas permanent data can be stored for example, in the internal mass storage (2147). Fast storage and retrieve to any of the memory devices can be enabled through the use of cache memory, that can be closely associated with one or more CPU (2141), GPU (2142), mass storage (2147), ROM (2145), RAM (2146), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (2100), and specifically the core (2140) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (2140) that are of non-transitory nature, such as core-internal mass storage (2147) or ROM (2145). The software implementing various embodiments of the present disclosure can be stored in such devices and executed by core (2140). A computer-readable medium can include one or more memory devices or chips, according to particular needs. The software can cause the core (2140) and specifically the processors therein (including CPU, GPU, FPGA, and the like) to execute particular processes or particular parts of particular processes described herein, including defining data structures stored in RAM (2146) and modifying such data structures according to the processes defined by the software. In addition or as an alternative, the computer system can provide functionality as a result of logic hardwired or otherwise embodied in a circuit (for example: accelerator (2144)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

Appendix A: Acronyms

JEM: joint exploration model
VVC: versatile video coding
BMS: benchmark set
MV: Motion Vector
HEVC: High Efficiency Video Coding
SEI: Supplementary Enhancement Information
VUI: Video Usability Information
GOPs: Groups of Pictures
TUs: Transform Units,
PUs: Prediction Units
CTUs: Coding Tree Units
CTBs: Coding Tree Blocks PBs: Prediction Blocks
HRD: Hypothetical Reference Decoder
SNR: Signal Noise Ratio
CPUs: Central Processing Units
GPUs: Graphics Processing Units
CRT: Cathode Ray Tube
LCD: Liquid-Crystal Display
OLED: Organic Light-Emitting Diode
CD: Compact Disc
DVD: Digital Video Disc
ROM: Read-Only Memory
RAM: Random Access Memory
ASIC: Application-Specific Integrated Circuit
PLD: Programmable Logic Device
LAN: Local Area Network
GSM: Global System for Mobile communications
LTE: Long-Term Evolution
CANBus: Controller Area Network Bus
USB: Universal Serial Bus
PCI: Peripheral Component Interconnect
FPGA: Field Programmable Gate Areas
SSD: solid-state drive
IC: Integrated Circuit
CU: Coding Unit While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof

What is claimed is:

1. A method of video decoding, comprising:
   receiving a bit stream that includes coded information representing a bin of a syntax element for a current block in a picture, the bin of the syntax element indicating whether a local illumination compensation (LIC) process is applied to code the current block;
   determining whether there is at least one sub-block of top row sub-blocks or left column sub-blocks of the current block that meets one or more conditions for applying the LIC process, the one or more conditions being defined according to a coding characteristic of a region neighboring the current block;
   selecting, by processing circuitry, a context model from multiple candidate context models applicable to coding of the syntax element, according to a result of the determining whether there is the at least one sub-block that meets the one or more conditions;
   decoding, by the processing circuitry, the coded information according to the selected context model to obtain the bin of the syntax element;
   reconstructing the current block with the LIC process, in response to the bin indicating that the LIC process is applied to code the current block; and
   reconstructing the current block without the LIC process, in response to the bin indicating that the LIC process is not applied to code the current block.

2. The method of claim 1, wherein the selecting the context model from the multiple candidate context models comprises:
   selecting a first one of the multiple candidate context models as the selected context model in response to the result of the determining indicating that there is the at least one sub-block that meets the one or more conditions; and
   selecting a second one of the multiple candidate context models as the selected context model in response to the result of the determining indicating that none of the top row sub-blocks and the left column sub-blocks meets the one or more conditions.

3. The method of claim 2, wherein
   the first one of the multiple candidate context models corresponds to a first probability of the bin indicating that a probability of applying the LIC process is higher than a probability of not applying the LIC process, and
   the second one of the multiple candidate context models corresponds to a second probability of the bin indicating that the probability of not applying the LIC process is higher than the probability of applying the LIC process.

4. The method of claim 2, wherein
   each one of the multiple candidate context models is associated with a corresponding context incremental index,
   the first one of the multiple candidate context models is associated with a first context incremental index having a value of one of 0 and 1, and
   the second one of the multiple candidate context models is associated with a second context incremental index having a value of the other one of 0 and 1.

5. The method of claim 2, wherein the one or more conditions comprises:
   for a first sub-block that is one of the top row sub-blocks, an above block neighboring an upper side of the first sub-block being coded according to an inter prediction with no residue, and
   for a second sub-block that is one of the left column sub-blocks,
   a left block neighboring a left side of the second sub-block coded according to the inter prediction with no residue.

6. The method of claim 2, wherein the one or more conditions comprises:
   for a first sub-block that is one of the top row sub-blocks, an above block neighboring an upper side of the first sub-block being coded with root coded block flag (CBF) not zero,
   the above block being coded according to an inter prediction, and
   the above block not being coded according to a combined intra and inter prediction (CIIP), and
   for a second sub-block that is one of the left column sub-blocks,
   a left block neighboring a left side of the second sub-block being coded with the root CBF not zero,
   the left block being coded according to the inter prediction, and
   the left block not being coded according to the CIIP.

7. The method of claim 2, wherein
   the top row sub-blocks and the left column sub-blocks of the current block are within an upper left 16×16 sample region of the current block in a case that the current block has a size greater than 16×16 samples.

8. An apparatus, comprising:
   processing circuitry configured to:
   receive a bit stream that includes coded information representing a bin of a syntax element for a current block in a picture, the bin of the syntax element indicating whether a local illumination compensation (LIC) process is applied to code the current block;

determine whether there is at least one sub-block of top row sub-blocks or left column sub-blocks of the current block that meets one or more conditions for applying the LIC process, the one or more conditions being defined according to a coding characteristic of a region neighboring the current block;

select a context model from multiple candidate context models applicable to coding of the syntax element, according to a result of the determining whether there is the at least one sub-block that meets the one or more conditions;

decode the coded information according to the selected context model to obtain the bin of the syntax element;

reconstruct the current block with the LIC process, in response to the bin indicating that the LIC process is applied to code the current block; and reconstruct the current block without the LIC process, in response to the bin indicating that the LIC process is not applied to code the current block.

9. The apparatus of claim 8, wherein the processing circuitry is further configured to:

select a first one of the multiple candidate context models as the selected context model in response to the result of the determining indicating that there is the at least one sub-block that meets the one or more conditions; and select a second one of the multiple candidate context models as the selected context model in response to the result of the determining indicating that none of the top row sub-blocks and the left column sub-blocks meets the one or more conditions.

10. The apparatus of claim 9, wherein
the first one of the multiple candidate context models corresponds to a first probability of the bin indicating that a probability of applying the LIC process is higher than a probability of not applying the LIC process, and
the second one of the multiple candidate context models corresponds to a second probability of the bin indicating that a probability of not applying the LIC process is higher than the probability of applying the LIC process.

11. The apparatus of claim 9, wherein
each one of the multiple candidate context models is associated with a corresponding context incremental index,
the first one of the multiple candidate context models is associated with a first context incremental index having a value of one of 0 and 1, and
the second one of the multiple candidate context models is associated with a second context incremental index having a value of the other one of 0 and 1.

12. The apparatus of claim 9, wherein the one or more conditions comprises:
for a first sub-block that is one of the top row sub-blocks,
an above block neighboring an upper side of the first sub-block being coded according to an inter prediction with no residue, and
for a second sub-block that is one of the left column sub-blocks,
a left block neighboring a left side of the second sub-block being coded according to the inter prediction with no residue.

13. The apparatus of claim 9, wherein the one or more conditions comprises:

for a first sub-block that is one of the top row sub-blocks,
an above block neighboring an upper side of the first sub-block being coded with root coded block flag (CBF) not zero,
the above block being coded according to an inter prediction, and
the above block not being coded according to a combined intra and inter prediction (CIIP), and
for a second sub-block that is one of the left column sub-blocks,
a left block neighboring a left side of the second sub-block being coded with the root CBF not zero,
the left block being coded according to the inter prediction, and
the left block not being coded according to the CIIP.

14. The apparatus of claim 9, wherein
the top row sub-blocks and the left column sub-blocks of the current block are within an upper left 16×16 sample region of the current block in a case that the current block has a size greater than 16×16 samples.

15. A non-transitory computer-readable medium storing instructions which when executed by a computer for video decoding cause the computer to perform:

receiving a bit stream that includes coded information representing a bin of a syntax element for a current block in a picture, the bin of the syntax element indicating whether a local illumination compensation (LIC) process is applied to code the current block;

determining whether there is at least one sub-block of top row sub-blocks or left column sub-blocks of the current block that meets one or more conditions for applying the LIC process, the one or more conditions being defined according to a coding characteristic of a region neighboring the current block;

selecting a context model from multiple candidate context models applicable to coding of the syntax element, according to a result of the determining whether there is the at least one sub-block that meets the one or more conditions;

decoding the coded information according to the selected context model to obtain the bin of the syntax element;

reconstructing the current block with the LIC process, in response to the bin indicating that the LIC process is applied to code the current block; and reconstructing the current block without the LIC process, in response to the bin indicating that the LIC process is not applied to code the current block.

16. The non-transitory computer-readable medium of claim 15, wherein the selecting the context model from the multiple candidate context models comprises:

selecting a first one of the multiple candidate context models as the selected context model in response to the result of the determining indicating that there is the at least one sub-block that meets the one or more conditions; and selecting a second one of the multiple candidate context models as the selected context model in response to the result of the determining indicating that none of the top row sub-blocks and the left column sub-blocks meets the one or more conditions.

17. The non-transitory computer-readable medium of claim 16, wherein
the first one of the multiple candidate context models corresponds to a first probability of the bin indicating that a probability of applying the applying LIC process is higher than a probability of not applying the LIC process, and the second one of the multiple candidate context models corresponds to a second probability of the bin indicating that the probability of not applying the LIC process is higher than the probability of applying the LIC process.

18. The non-transitory computer-readable medium of claim 16, wherein each one of the multiple candidate context models is associated with a corresponding context incremental index, the first one of the multiple candidate context models is associated with a first context incremental index having a value of one of 0 and 1, and the second one of the multiple candidate context models is associated with a second context incremental index having a value of the other one of 0 and 1.

19. The non-transitory computer-readable medium of claim 16, wherein for a first sub-block that is one of the top row sub-blocks, an above block neighboring an upper side of the first sub-block being coded with root coded block flag (CBF) not zero, the above block being coded according to an inter prediction, and the above block not being coded according to a combined intra and inter prediction (CIIP), and for a second sub-block that is one of the left column sub-blocks, a left block neighboring a left side of the second sub-block being coded with the root CBF not zero, the left block being coded according to the inter prediction, and the left block not being coded according to the CIIP.

20. The non-transitory computer-readable medium of claim 16, wherein the top row sub-blocks and the left column sub-blocks of the current block are within an upper left 16×16 sample region of the current block in a case that the current block has a size greater than 16×16 samples.

* * * * *